(12) United States Patent
Okumura et al.

(10) Patent No.: US 12,282,972 B2
(45) Date of Patent: Apr. 22, 2025

(54) ELECTRIC POWER AGREEMENT SYSTEM AND ELECTRIC POWER AGREEMENT METHOD

(71) Applicant: Mitsubishi Electric Corporation, Tokyo (JP)

(72) Inventors: Yuta Okumura, Tokyo (JP); Shunsuke Kawano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 377 days.

(21) Appl. No.: 17/798,568

(22) PCT Filed: Apr. 28, 2020

(86) PCT No.: PCT/JP2020/018059
§ 371 (c)(1),
(2) Date: Aug. 10, 2022

(87) PCT Pub. No.: WO2021/220381
PCT Pub. Date: Nov. 4, 2021

(65) Prior Publication Data
US 2023/0065402 A1    Mar. 2, 2023

(51) Int. Cl.
*G06Q 50/06* (2024.01)
*H02J 3/00* (2006.01)

(52) U.S. Cl.
CPC .............. *G06Q 50/06* (2013.01); *H02J 3/008* (2013.01); *H02J 2203/20* (2020.01)

(58) Field of Classification Search
CPC .... G06Q 50/06; G06Q 30/0201; G06Q 40/04; G06Q 10/063; H02J 3/008; H02J 2203/20; H02J 2203/10
See application file for complete search history.

(56) References Cited

U.S. PATENT DOCUMENTS

2002/0194113 A1* 12/2002 Lof .......................... G01W 1/10
705/37
2004/0215545 A1* 10/2004 Murakami ............. G06Q 40/06
705/36 R
(Continued)

FOREIGN PATENT DOCUMENTS

JP    2006-215758 A    8/2006
JP    2006-260087 A    9/2006
(Continued)

OTHER PUBLICATIONS

Extended European Search Report issued May 22, 2023 in European Patent Application No. 20932873.1, 9 pages.
(Continued)

*Primary Examiner* — Chad G Erdman
(74) *Attorney, Agent, or Firm* — XSENSUS LLP

(57) ABSTRACT

The present disclosure is intended to reduce the occurrence of breakdown of a line facility due to variation between an agreement result and electric power actually flowing through a line. An electric power agreement system includes: an agreement result calculation unit that calculates an agreement result about each customer; a flow achievement calculation unit that calculates a flow achievement for the line facility individually; a flow plan calculation unit that calculates as the flow plan for the line facility individually; a risk calculation unit that calculates a variation of the flow achievement from the flow plan assumed in the future as a risk for the line facility individually on the basis of a variation of the flow achievement from the flow plan in the past; and a line constraint evaluation unit that determines for the line facility individually whether a risk-considered flow plan fulfills line constraint.

15 Claims, 24 Drawing Sheets

(56) References Cited

U.S. PATENT DOCUMENTS

| | | | | |
|---|---|---|---|---|
| 2019/0172159 A1* | 6/2019 | Sun | ...................... | G06Q 30/018 |
| 2021/0273483 A1* | 9/2021 | Ding | ...................... | H02J 9/068 |
| 2022/0121260 A1* | 4/2022 | King | ...................... | H02J 3/381 |

FOREIGN PATENT DOCUMENTS

| | | | | |
|---|---|---|---|---|
| JP | 2019-91106 A | 6/2019 | | |
| WO | WO-2019187359 A1 * | 10/2019 | .............. | H02J 3/241 |

OTHER PUBLICATIONS

International Search Report and Written Opinion mailed on Jul. 21, 2020, received for PCT Application PCT/JP2020/018059, filed on Apr. 28, 2020, 8 pages including English Translation.

* cited by examiner

FIG. 4

HEADER PART: CUSTOMER 1-1 "SALE"

BODY PART:

| UNIT PRICE[¥/kWh] | * | 10 | 11 | * |
|---|---|---|---|---|
| AMOUNT OF ELECTRIC POWER[kWh] | * | 8 | 19 | * |

FIG. 5

HEADER PART: CUSTOMER 2-1 "PURCHASE"

BODY PART:

| UNIT PRICE[¥/kWh] | * | 11 | 12 | * |
|---|---|---|---|---|
| AMOUNT OF ELECTRIC POWER[kWh] | * | 18 | 5 | * |

FIG. 6

HEADER PART: CUSTOMER 3-1 "PURCHASE"

BODY PART:

| UNIT PRICE[¥/kWh] | * | 10 | 11 | * |
|---|---|---|---|---|
| AMOUNT OF ELECTRIC POWER[kWh] | * | 8 | 1 | * |

HEADER PART: CUSTOMER 2-1
BODY PART:

| TIME ZONE | 2018/12/31 23:30 ~ 2019/1/1 00:00 | 2018/12/31 23:00 ~ 2018/12/31 23:30 | 2018/12/31 22:30 ~ 2018/12/31 23:00 | · |
|---|---|---|---|---|
| AMOUNT OF ELECTRIC POWER [kWh] | 10 | 12 | 10 | · |

HEADER PART: CUSTOMER 2-1
BODY PART:

| TIME ZONE | 2018/12/31 23:30 ~ 2019/1/1 00:00 | 2018/12/31 23:00 ~ 2018/12/31 23:30 | 2018/12/31 22:30 ~ 2018/12/31 23:00 | · |
|---|---|---|---|---|
| AMOUNT OF ELECTRIC POWER [kWh] | 7 | 12 | 14 | · |

FIG. 12

FACILITY CONSTRAINT

| LINE FACILITY | TRANSFORMER 1 | TRANSFORMER 2 | TRANSFORMER 3 |
|---|---|---|---|
| CAPACITY CONSTRAINT[kWh] | 22 | 20 | 21 |

FIG. 13

HEADER PART: CUSTOMER 2-1

BODY PART:

| TIME ZONE | 2018/12/31 23:30 ~ 2019/1/1 00:00 | · | 2018/12/31 00:00 ~ 2018/12/31 00:30 | · | 2018/12/30 00:00 ~ 2018/12/30 00:30 | · | 2018/12/29 00:00 ~ 2018/12/29 00:30 | · |
|---|---|---|---|---|---|---|---|---|
| AMOUNT OF ELECTRIC POWER [kWh] | 3 | · | -2 | · | 5 | · | 6 | · |

FIG. 14

HEADER PART: TRANSFORMER 2

BODY PART:

| TIME ZONE | 2018/12/31 23:30 ~ 2019/1/1 00:00 | · | 2018/12/31 00:00 ~ 2018/12/31 00:30 | · | 2018/12/30 00:00 ~ 2018/12/30 00:30 | · | 2018/12/29 00:00 ~ 2018/12/29 00:30 | · |
|---|---|---|---|---|---|---|---|---|
| AMOUNT OF ELECTRIC POWER [kWh] | 3 | · | -2 | · | 5 | · | 6 | · |

FIG. 15

HEADER PART: TRANSFORMER 2

BODY PART:

| TIME ZONE | 2018/12/31 23:30 ~ 2019/1/1 00:00 | · | 2018/12/31 00:00 ~ 2018/12/31 00:30 | · | 2018/12/30 00:00 ~ 2018/12/30 00:30 | · | 2018/12/29 00:00 ~ 2018/12/29 00:30 | · |
|---|---|---|---|---|---|---|---|---|
| AMOUNT OF ELECTRIC POWER [kWh] | 3 | · | 3 | · | 2 | · | 1 | · |

FIG. 16

| EVALUATION INDEX | WORST CASE IN THE PAST |
|---|---|

FIG. 17

HEADER PART: TRANSFORMER 1
BODY PART:

| TIME ZONE | 00:00 - 00:30 | 00:30 - 01:00 | 01:00 - 01:30 | · |
|---|---|---|---|---|
| UPWARD RISK[kWh] | 2 | 2 | 3 | · |
| DOWNWARD RISK[kWh] | -1 | 0 | 2 | · |

FIG. 18

HEADER PART: TRANSFORMER 2
BODY PART:

| TIME ZONE | 00:00 - 00:30 | 00:30 - 01:00 | 01:00 - 01:30 | · |
|---|---|---|---|---|
| UPWARD RISK[kWh] | 5 | 5 | 4 | · |
| DOWNWARD RISK[kWh] | -5 | -2 | -4 | · |

FIG. 19

HEADER PART: TRANSFORMER 3
BODY PART:

| TIME ZONE | 00:00 - 00:30 | 00:30 - 01:00 | 01:00 - 01:30 | · |
|---|---|---|---|---|
| UPWARD RISK[kWh] | 4 | 1 | 2 | · |
| DOWNWARD RISK[kWh] | -3 | -2 | -2 | · |

FIG. 20

HEADER PART: CUSTOMER 1-1
BODY PART:

| TIME ZONE | 2019/1/1 00:00 – 2019/1/1 00:30 | 2018/12/31 23:30 – 2019/1/1 00:00 | 2018/12/31 23:00 – 2018/12/31 23:30 | · |
|---|---|---|---|---|
| AMOUNT OF ELECTRIC POWER[kWh] | 19 | 3 | 7 | · |
| PRICE[¥/kWh] | 11 | 13 | 12 | · |

FIG. 21

HEADER PART: CUSTOMER 2-1
BODY PART:

| TIME ZONE | 2019/1/1 00:00 – 2019/1/1 00:30 | 2018/12/31 23:30 – 2019/1/1 00:00 | 2018/12/31 23:00 – 2018/12/31 23:30 | · |
|---|---|---|---|---|
| AMOUNT OF ELECTRIC POWER[kWh] | −18 | 3 | −1 | · |
| PRICE[¥/kWh] | 11 | 13 | 12 | · |

FIG. 22

HEADER PART: CUSTOMER 3-1
BODY PART:

| TIME ZONE | 2019/1/1 00:00 – 2019/1/1 00:30 | 2018/12/31 23:30 – 2019/1/1 00:00 | 2018/12/31 23:00 – 2018/12/31 23:30 | · |
|---|---|---|---|---|
| AMOUNT OF ELECTRIC POWER[kWh] | −1 | −6 | −5 | · |
| PRICE[¥/kWh] | 11 | 13 | 12 | · |

FIG. 23

HEADER PART:TRANSFORMER 1

BODY PART:

| TIME ZONE | 2019/1/1 00:00 — 2019/1/1 00:30 | 2018/12/31 23:30 — 2019/1/1 00:00 | 2018/12/31 23:00 — 2018/12/31 23:30 | ... |
|---|---|---|---|---|
| AMOUNT OF ELECTRIC POWER[kWh] | 19 | 3 | 6 | . |

FIG. 24

HEADER PART:TRANSFORMER 2

BODY PART:

| TIME ZONE | 2019/1/1 00:00 — 2019/1/1 00:30 | 2018/12/31 23:30 — 2019/1/1 00:00 | 2018/12/31 23:00 — 2018/12/31 23:30 | ... |
|---|---|---|---|---|
| AMOUNT OF ELECTRIC POWER[kWh] | −18 | 3 | −1 | . |

FIG. 25

HEADER PART:TRANSFORMER 3

BODY PART:

| TIME ZONE | 2019/1/1 00:00 — 2019/1/1 00:30 | 2018/12/31 23:30 — 2019/1/1 00:00 | 2018/12/31 23:00 — 2018/12/31 23:30 | ... |
|---|---|---|---|---|
| AMOUNT OF ELECTRIC POWER[kWh] | −1 | −6 | −5 | . |

FIG. 29

HEADER PART: CUSTOMER 1-1 "SALE"

BODY PART:

| UNIT PRICE[¥/kWh] | · | 10 | 11 | × |
|---|---|---|---|---|
| AMOUNT OF ELECTRIC POWER[kWh] | · | 8 | 19 | × |

FIG. 30

HEADER PART: CUSTOMER 2-1 "PURCHASE"

BODY PART:

| UNIT PRICE[¥/kWh] | × | 11 | 12 | · |
|---|---|---|---|---|
| AMOUNT OF ELECTRIC POWER[kWh] | × | 19 | 5 | · |

FIG. 31

HEADER PART: CUSTOMER 2-2 "PURCHASE"

BODY PART:

| UNIT PRICE[¥/kWh] | · | 11 | 12 | × |
|---|---|---|---|---|
| AMOUNT OF ELECTRIC POWER[kWh] | · | 1 | 5 | · |

HEADER PART: CUSTOMER 3-1 "PURCHASE"

BODY PART:

| UNIT PRICE[¥/kWh] | · | 10 | 11 | · |
|---|---|---|---|---|
| AMOUNT OF ELECTRIC POWER[kWh] | · | 8 | 1 | · |

HEADER PART: CUSTOMER 2-1

BODY PART:

| TIME ZONE | 2018/12/31 23:30 ~ 2019/1/1 00:00 | 2018/12/31 23:00 ~ 2018/12/31 23:30 | 2018/12/31 22:30 ~ 2018/12/31 23:00 | · |
|---|---|---|---|---|
| AMOUNT OF ELECTRIC POWER[kWh] | 10 | 12 | 10 | · |

HEADER PART: CUSTOMER 2-1

BODY PART:

| TIME ZONE | 2018/12/31 23:30 ~ 2019/1/1 00:00 | 2018/12/31 23:00 ~ 2018/12/31 23:30 | 2018/12/31 22:30 ~ 2018/12/31 23:00 | · |
|---|---|---|---|---|
| AMOUNT OF ELECTRIC POWER[kWh] | 7 | 12 | 14 | · |

FIG. 36

FACILITY CONSTRAINT

| LINE FACILITY | TRANSFORMER 1 | TRANSFORMER 2 | TRANSFORMER 3 |
|---|---|---|---|
| CAPACITY CONSTRAINT[kWh] | 22 | 20 | 21 |

FIG. 37

HEADER PART: CUSTOMER 2-1

BODY PART:

| TIME ZONE | 2018/12/31 23:30 – 2019/1/1 00:00 | ... | 2018/12/31 00:00 – 2018/12/31 00:30 | ... | 2018/12/30 00:00 – 2018/12/30 00:30 | ... | 2018/12/29 00:00 – 2018/12/29 00:30 | ... |
|---|---|---|---|---|---|---|---|---|
| AMOUNT OF ELECTRIC POWER [kWh] | 3 | ... | 5 | ... | 2 | ... | 2 | ... |

FIG. 38

HEADER PART: CUSTOMER 2-2

BODY PART:

| TIME ZONE | 2018/12/31 23:30 – 2019/1/1 00:00 | ... | 2018/12/31 00:00 – 2018/12/31 00:30 | ... | 2018/12/30 00:00 – 2018/12/30 00:30 | ... | 2018/12/29 00:00 – 2018/12/29 00:30 | ... |
|---|---|---|---|---|---|---|---|---|
| AMOUNT OF ELECTRIC POWER [kWh] | 3 | ... | 3 | ... | 3 | ... | 3 | ... |

FIG. 39

HEADER PART: TRANSFORMER 2

BODY PART:

| TIME ZONE | 2018/12/31 23:30 – 2019/1/1 00:00 | ... | 2018/12/31 00:00 – 2018/12/31 00:30 | ... | 2018/12/30 00:00 – 2018/12/30 00:30 | ... | 2018/12/29 00:00 – 2018/12/29 00:30 | ... |
|---|---|---|---|---|---|---|---|---|
| AMOUNT OF ELECTRIC POWER [kWh] | 6 | ... | 8 | ... | 5 | ... | 5 | ... |

FIG. 40

HEADER PART: TRANSFORMER 2
BODY PART:

| TIME ZONE | 2018/12/31 23:30 – 2019/1/1 00:00 | . | 2018/12/31 00:00 – 2018/12/31 00:30 | . | 2018/12/30 00:00 – 2018/12/30 00:30 | . | 2018/12/29 00:00 – 2018/12/29 00:30 | . |
|---|---|---|---|---|---|---|---|---|
| AMOUNT OF ELECTRIC POWER [kWh] | 3 | . | 3 | . | 2 | . | 1 | . |

FIG. 41

| EVALUATION INDEX | WORST CASE IN THE PAST |
|---|---|

FIG. 42

HEADER PART: TRANSFORMER 1
BODY PART:

| TIME ZONE | 00:00 ~ 00:30 | 00:30 ~ 01:00 | 01:00 ~ 01:30 | . |
|---|---|---|---|---|
| UPWARD RISK [kWh] | 2 | 2 | 3 | . |
| DOWNWARD RISK [kWh] | -1 | 0 | 2 | . |

FIG. 43

HEADER PART: TRANSFORMER 2
BODY PART:

| TIME ZONE | 00:00 ~ 00:30 | 00:30 ~ 01:00 | 01:00 ~ 01:30 | . |
|---|---|---|---|---|
| UPWARD RISK [kWh] | 5 | 5 | 4 | . |
| DOWNWARD RISK [kWh] | -5 | -2 | -4 | . |

FIG. 44

HEADER PART: TRANSFORMER 3
BODY PART:

| TIME ZONE | 00:00 – 00:30 | 00:30 – 01:00 | 01:00 – 01:30 | · |
|---|---|---|---|---|
| UPWARD RISK[kWh] | 4 | 1 | 2 | · |
| DOWNWARD RISK[kWh] | −3 | −2 | −2 | · |

FIG. 45

HEADER PART: CUSTOMER 1-1
BODY PART:

| TIME ZONE | 2019/1/1 00:00 ~ 2019/1/1 00:30 | 2018/12/31 23:30 ~ 2019/1/1 00:00 | 2018/12/31 23:00 ~ 2018/12/31 23:30 | · |
|---|---|---|---|---|
| AMOUNT OF ELECTRIC POWER[kWh] | 19 | 3 | 6 | · |
| PRICE[¥/kWh] | 11 | 13 | 12 | · |

FIG. 46

HEADER PART: CUSTOMER 2-1
BODY PART:

| TIME ZONE | 2019/1/1 00:00 ~ 2019/1/1 00:30 | 2018/12/31 23:30 ~ 2019/1/1 00:00 | 2018/12/31 23:00 ~ 2018/12/31 23:30 | · |
|---|---|---|---|---|
| AMOUNT OF ELECTRIC POWER[kWh] | −19 | 5 | −1 | · |
| PRICE[¥/kWh] | 11 | 13 | 12 | · |

FIG. 47

HEADER PART: CUSTOMER 2-2
BODY PART:

| TIME ZONE | 2019/1/1 00:00 ~ 2019/1/1 00:30 | 2018/12/31 23:30 ~ 2019/1/1 00:00 | 2018/12/31 23:00 ~ 2018/12/31 23:30 | · |
|---|---|---|---|---|
| AMOUNT OF ELECTRIC POWER[kWh] | 1 | −2 | 0 | · |
| PRICE[¥/kWh] | 11 | 13 | 12 | · |

FIG. 48

HEADER PART: CUSTOMER 3-1
BODY PART:

| TIME ZONE | 2019/1/1 00:00 – 2019/1/1 00:30 | 2018/12/31 23:30 – 2019/1/1 00:00 | 2018/12/31 23:00 – 2018/12/31 23:30 | ... |
|---|---|---|---|---|
| AMOUNT OF ELECTRIC POWER[kWh] | −1 | −6 | −5 | ... |
| PRICE[¥/kWh] | 11 | 13 | 12 | ... |

FIG. 49

HEADER PART: TRANSFORMER 1
BODY PART:

| TIME ZONE | 2019/1/1 00:00 – 2019/1/1 00:30 | 2018/12/31 23:30 – 2019/1/1 00:00 | 2018/12/31 23:00 – 2018/12/31 23:30 | ... |
|---|---|---|---|---|
| AMOUNT OF ELECTRIC POWER[kWh] | 19 | 3 | 6 | ... |

FIG. 50

HEADER PART: TRANSFORMER 2
BODY PART:

| TIME ZONE | 2019/1/1 00:00 – 2019/1/1 00:30 | 2018/12/31 23:30 – 2019/1/1 00:00 | 2018/12/31 23:00 – 2018/12/31 23:30 | ... |
|---|---|---|---|---|
| AMOUNT OF ELECTRIC POWER[kWh] | −18 | 3 | −1 | ... |

FIG. 51

HEADER PART: TRANSFORMER 3
BODY PART:

| TIME ZONE | 2019/1/1 00:00 – 2019/1/1 00:30 | 2018/12/31 23:30 – 2019/1/1 00:00 | 2018/12/31 23:00 – 2018/12/31 23:30 | ... |
|---|---|---|---|---|
| AMOUNT OF ELECTRIC POWER[kWh] | −1 | −6 | −5 | ... |

FIG. 52

HEADER PART: CUSTOMER 1-1
BODY PART:

| TIME ZONE | 2019/1/1 00:00 ~ 2019/1/1 00:30 | 2018/12/31 23:30 ~ 2019/1/1 00:00 | 2018/12/31 23:00 ~ 2018/12/31 23:30 | · |
|---|---|---|---|---|
| AMOUNT OF ELECTRIC POWER[kWh] | 8 | 3 | 6 | · |
| PRICE[¥/kWh] | 10 | 13 | 12 | · |

FIG. 53

HEADER PART: CUSTOMER 2-1
BODY PART:

| TIME ZONE | 2019/1/1 00:00 ~ 2019/1/1 00:30 | 2018/12/31 23:30 ~ 2019/1/1 00:00 | 2018/12/31 23:00 ~ 2018/12/31 23:30 | · |
|---|---|---|---|---|
| AMOUNT OF ELECTRIC POWER[kWh] | -5 | 5 | -1 | · |
| PRICE[¥/kWh] | 12 | 13 | 12 | · |

FIG. 54

HEADER PART: CUSTOMER 2-2
BODY PART:

| TIME ZONE | 2019/1/1 00:00 ~ 2019/1/1 00:30 | 2018/12/31 23:30 ~ 2019/1/1 00:00 | 2018/12/31 23:00 ~ 2018/12/31 23:30 | · |
|---|---|---|---|---|
| AMOUNT OF ELECTRIC POWER[kWh] | 5 | -2 | 0 | · |
| PRICE[¥/kWh] | 12 | 13 | 12 | · |

FIG. 55

HEADER PART: CUSTOMER 3-1
BODY PART:

| TIME ZONE | 2019/1/1 00:00 ~ 2019/1/1 00:30 | 2018/12/31 23:30 ~ 2019/1/1 00:00 | 2018/12/31 23:00 ~ 2018/12/31 23:30 | · |
|---|---|---|---|---|
| AMOUNT OF ELECTRIC POWER[kWh] | -8 | -6 | -5 | · |
| PRICE[¥/kWh] | 10 | 13 | 12 | · |

FIG. 56

HEADER PART:TRANSFORMER 1

BODY PART:

| TIME ZONE | 2019/1/1 00:00 ~ 2019/1/1 00:30 | 2018/12/31 23:30 ~ 2019/1/1 00:00 | 2018/12/31 23:00 ~ 2018/12/31 23:30 | · |
|---|---|---|---|---|
| AMOUNT OF ELECTRIC POWER[kWh] | 8 | 3 | 6 | · |

FIG. 57

HEADER PART:TRANSFORMER 2

BODY PART:

| TIME ZONE | 2019/1/1 00:00 ~ 2019/1/1 00:30 | 2018/12/31 23:30 ~ 2019/1/1 00:00 | 2018/12/31 23:00 ~ 2018/12/31 23:30 | · |
|---|---|---|---|---|
| AMOUNT OF ELECTRIC POWER[kWh] | 0 | 3 | -1 | · |

FIG. 58

HEADER PART:TRANSFORMER 3

BODY PART:

| TIME ZONE | 2019/1/1 00:00 ~ 2019/1/1 00:30 | 2018/12/31 23:30 ~ 2019/1/1 00:00 | 2018/12/31 23:00 ~ 2018/12/31 23:30 | · |
|---|---|---|---|---|
| AMOUNT OF ELECTRIC POWER[kWh] | -8 | -6 | -5 | · |

FIG. 61

| TIME ZONE | 2018/12/31 23:30 ~ 2019/1/1 00:00 | · | 2018/12/31 00:00 ~ 2018/12/31 00:30 | · | 2018/12/30 00:00 ~ 2018/12/30 00:30 | · | 2018/12/29 00:00 ~ 2018/12/29 00:30 | · |
|---|---|---|---|---|---|---|---|---|
| PATTERN | PATTERN 2 | · | PATTERN 1 | · | PATTERN 1 | · | PATTERN 2 | · |

FIG. 62

| LINE FACILITY | TRANSFORMER 1 | TRANSFORMER 2 | TRANSFORMER 3 |
|---|---|---|---|
| PATTERN 1 | × | × | × |
| PATTERN 2 | × | ○ | × |
| · | · | · | · |

FIG. 63

HEADER PART: PATTERN 1 TRANSFORMER 1
BODY PART:

| TIME ZONE | 00:00 ~ 00:30 | 00:30 ~ 01:00 | 01:00 ~ 01:30 | · |
|---|---|---|---|---|
| UPWARD RISK[kWh] | 3 | 4 | 1 | · |
| DOWNWARD RISK[kWh] | -2 | 1 | 1 | · |

FIG. 64
HEADER PART: PATTERN 1 TRANSFORMER 2
BODY PART:
| TIME ZONE | 00:00 - 00:30 | 00:30 - 01:00 | 01:00 - 01:30 | . |
|---|---|---|---|---|
| UPWARD RISK[kWh] | 5 | 4 | 6 | . |
| DOWNWARD RISK[kWh] | 0 | -2 | -3 | . |
FIG. 65
HEADER PART: PATTERN 1 TRANSFORMER 3
BODY PART:
| TIME ZONE | 00:00 - 00:30 | 00:30 - 01:00 | 01:00 - 01:30 | . |
|---|---|---|---|---|
| UPWARD RISK[kWh] | 5 | 1 | 2 | . |
| DOWNWARD RISK[kWh] | -2 | -3 | -2 | . |
FIG. 66
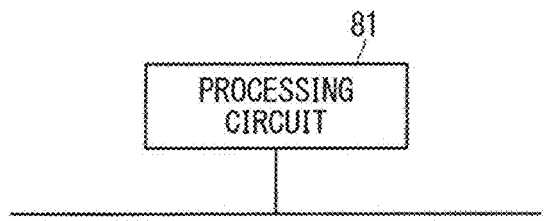
FIG. 67
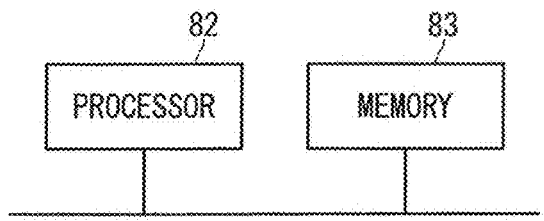

ELECTRIC POWER AGREEMENT SYSTEM AND ELECTRIC POWER AGREEMENT METHOD

CROSS-REFERENCE TO RELATED APPLICATION

The present application is based on PCT filing PCT/JP2020/018059, filed Apr. 28, 2020, the entire contents of which are incorporated herein by reference.

TECHNICAL FIELD

The present disclosure relates to evaluation of the amount of electric power flowing through a line facility of an electric power line.

BACKGROUND ART

Patent Document 1 suggests an electric power transaction intermediation system by which, in calculating an agreement result from bidding information about trading of electric power, consideration is given to line constraint such as constraint on inter-regional interconnection to calculate an agreement result not deviating from the line constraint.

PRIOR ART DOCUMENTS

Patent Documents

Patent Document 1: Japanese Patent Application Laid-Open No. 2006-215758

SUMMARY

Problem to be Solved by the Invention

An electric power generation operator or a retail operator (these will be called an "operator" collectively) is obligated to pay a penalty if there is alienation between the amount of electric power actually generated or the amount of retail electric power sold and an agreement result, so that it has incentive to generate electric power or sell retail electric power in conformity with the agreement result. The electric power transaction intermediation system of Patent Document 1 is based on the assumption that a player to trade electric power is an operator, so that no serious alienation occurs between the agreement result and electric power actually flowing through a line. Regarding trading of electric power between electric power generators and electric power customers such as prosumers, however, these players are not obligated to pay the above-described penalty. Hence, in many cases, electric power actually flowing through a line does not conform to the agreement result. This causes a problem that, even if deviation from line constraint does not occur in terms of the agreement result, electric power actually flowing through the line deviates from the line constraint and this becomes a cause for breakdown of a line facility such as a transformer or a voltage inverter.

The present disclosure has been made to solve the above-describe problem, and is intended to reduce the occurrence of breakdown of a line facility due to variation of electric power actually flowing through a line from an agreement result.

Means to Solve the Problem

An electric power agreement system according to the present disclosure is an electric power agreement system that evaluates a flow plan for an electric power line. The electric power line includes at least one line facility. At least one customer is connected to each line facility. The electric power agreement system includes: an agreement result calculation unit that calculates an agreement result including the amount of electric power to be traded and an electric power unit price about each customer; a flow achievement calculation unit that calculates a total of actual numbers of the amount of surplus electric power about the customer connected to the line facility as a flow achievement for the line facility individually; a flow plan calculation unit that calculates a total value of the amounts of electric power to be traded in the agreement result about the customer connected to the line facility as the flow plan for the line facility individually; a risk calculation unit that calculates a variation of the flow achievement from the flow plan assumed in the future as a risk for the line facility individually on the basis of a variation of the flow achievement from the flow plan in the past; and a line constraint evaluation unit that determines for the line facility individually whether a risk-considered flow plan obtained by adding the risk to the flow plan fulfills line constraint defined on the line facility.

Effects of the Invention

The electric power agreement system of the present disclosure is capable of evaluating the line constraint while giving consideration to the risk of variation of the flow achievement from the flow plan. Thus, by correcting the agreement result properly in response to a result of the evaluation, it becomes possible to reduce the occurrence of breakdown of the line facility due to variation of electric power actually flowing through the line from the agreement result. These and other objects, features, aspects and advantages of the present disclosure will become more apparent from the following detailed description and the accompanying drawings.

BRIEF DESCRIPTION OF DRAWINGS

FIG. 4 shows bidding information according to the first embodiment;

FIG. 5 shows bidding information according to the first embodiment;

FIG. 6 shows bidding information according to the first embodiment;

FIG. 12 shows facility constraint information according to the first embodiment;

FIG. 13 shows surplus achievement information according to the first embodiment;

FIG. 14 shows flow achievement information according to the first embodiment;

FIG. 15 shows flow plan information according to the first embodiment;

FIG. 16 shows an evaluation index according to the first embodiment;

FIG. 17 shows risk information about a transformer 1 according to the first embodiment;

FIG. 18 shows risk information about a transformer 2 according to the first embodiment;

FIG. 19 shows risk information about a transformer 3 according to the first embodiment;

FIG. 20 shows agreement information about a customer 1-1 according to the first embodiment;

FIG. 21 shows agreement information about a customer 2-1 according to the first embodiment;

FIG. 22 shows agreement information about a customer 3-1 according to the first embodiment;

FIG. 23 shows flow plan information about the transformer 1 according to the first embodiment;

FIG. 24 shows flow plan information about the transformer 2 according to the first embodiment;

FIG. 25 shows flow plan information about the transformer 3 according to the first embodiment;

FIG. 29 shows bidding information according to the second embodiment;

FIG. 30 shows bidding information according to the second embodiment;

FIG. 31 shows bidding information according to the second embodiment;

FIG. 36 shows facility constraint information according to the second embodiment;

FIG. 37 shows surplus achievement information about the customer 2-1 according to the second embodiment;

FIG. 38 shows surplus achievement information about a customer 2-2 according to the second embodiment;

FIG. 39 shows flow achievement information about the transformer 2 according to the second embodiment;

FIG. 40 shows flow plan information about the transformer 2 according to the second embodiment;

FIG. 41 shows an evaluation index according to the second embodiment;

FIG. 42 shows risk information about the transformer 1 according to the second embodiment;

FIG. 43 shows risk information about the transformer 2 according to the second embodiment;

FIG. 44 shows risk information about the transformer 3 according to the second embodiment;

FIG. 45 shows agreement information about the customer 1-1 according to the second embodiment;

FIG. 46 shows agreement information about the customer 2-1 according to the second embodiment;

FIG. 47 shows agreement information about the customer 2-2 according to the second embodiment;

FIG. 48 shows agreement information about the customer 3-1 according to the second embodiment;

FIG. 49 shows flow plan information about the transformer 1 according to the second embodiment;

FIG. 50 shows flow plan information about the transformer 2 according to the second embodiment;

FIG. 51 shows flow plan information about the transformer 3 according to the second embodiment;

FIG. 52 shows recalculated agreement information about the customer 1-1 according to the second embodiment;

FIG. 53 shows recalculated agreement information about the customer 2-1 according to the second embodiment;

FIG. 54 shows recalculated agreement information about the customer 2-2 according to the second embodiment;

FIG. 55 shows recalculated agreement information about the customer 3-1 according to the second embodiment;

FIG. 56 shows recalculated flow plan information about the transformer 1 according to the second embodiment;

FIG. 57 shows recalculated flow plan information about the transformer 2 according to the second embodiment;

FIG. 58 shows recalculated flow plan information about the transformer 3 according to the second embodiment;

FIG. 61 shows split information according to the third embodiment;

FIG. 62 shows split pattern information according to the third embodiment;

FIG. 63 shows risk information about the transformer 1 following a pattern 1 according to the third embodiment;

FIG. 64 shows risk information about the transformer 2 following the pattern 1 according to the third embodiment;

FIG. 65 shows risk information about the transformer 3 following the pattern 1 according to the third embodiment;

FIG. 66 shows a hardware configuration of an electric power agreement system; and FIG. 67 shows a hardware configuration of an electric power agreement system.

DESCRIPTION OF EMBODIMENT(S)

A. First Embodiment 1

<A-1. Configuration>

Figure 1:
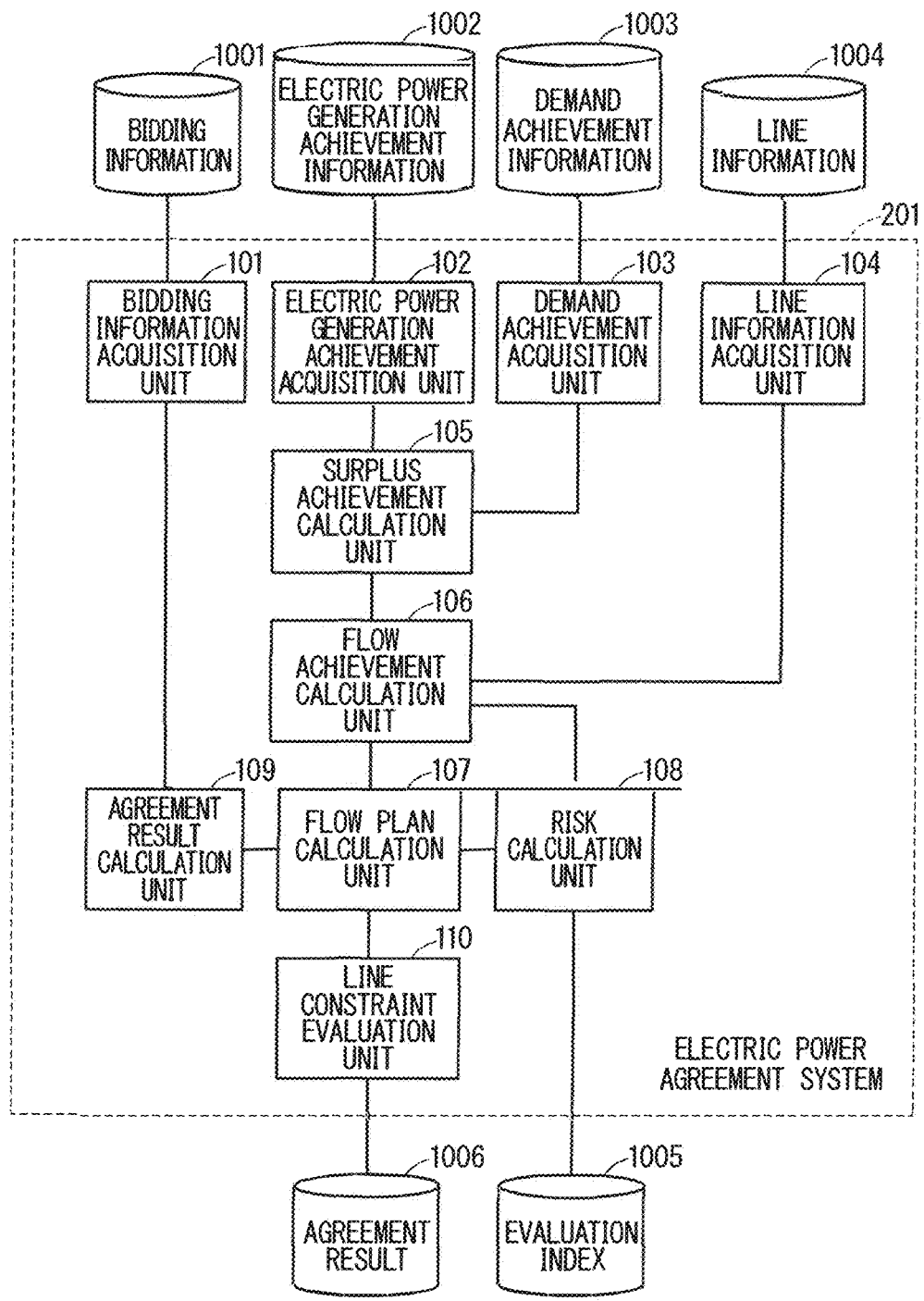
FIG. 1 is a configuration diagram of an electric power agreement system according to a first embodiment.

FIG. 1 is a configuration diagram of an electric power agreement system 201 according to a first embodiment. The electric power agreement system 201 is to make an agreement on trading of electric power with each customer of an electric power line and to determine whether a flow plan fulfills line constraint on the basis of an agreement result 1006. As shown in FIG. 1, the electric power agreement system 201 includes a bidding information acquisition unit 101, an electric power generation achievement acquisition unit 102, a demand achievement acquisition unit 103, a line information acquisition unit 104, a surplus achievement calculation unit 105, a flow achievement calculation unit 106, a flow plan calculation unit 107, a risk calculation unit 108, an agreement result calculation unit 109, and a line constraint evaluation unit 110.

The bidding information acquisition unit 101 acquires bidding information 1001 from each customer. The electric power generation achievement acquisition unit 102 acquires electric power generation achievement information 1002 about each customer. The demand achievement acquisition unit 103 acquires a demand achievement of each customer. The line information acquisition unit 104 acquires line information 1004 about an electric power line. The surplus achievement calculation unit 105 calculates a surplus achievement of each customer. The flow achievement calculation unit 106 calculates a flow achievement of the line facility individually. The flow plan calculation unit 107 calculates a flow plan for the line facility individually. The risk calculation unit 108 calculates an assumed variation of the flow achievement from the flow plan as a risk for the line facility individually. The agreement result calculation unit 109 calculates the agreement result 1006 from bidding information about each customer according to a blind single price auction system. The line constraint evaluation unit 110 determines for the line facility individually whether the flow plan fulfills line constraint while giving consideration to the risk.

Figure 2:
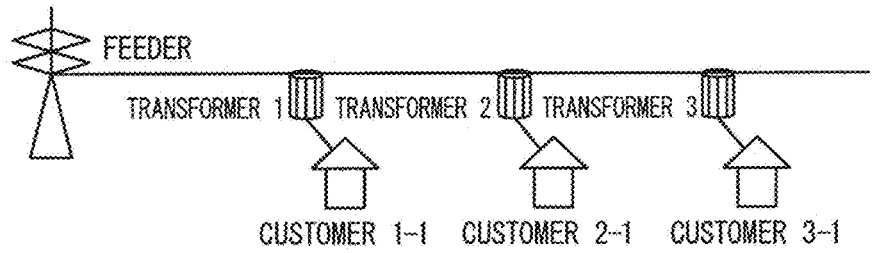
FIG. 2 shows an electric power line to which the electric power agreement system according to the first embodiment is applied.

FIG. 2 shows an electric power line to be evaluated in terms of line constraint by the electric power agreement system 201. As shown in FIG. 2, in the electric power line, three transformers 1, 2, and 3 are connected to one feeder. A customer 1-1, a customer 2-1, and a customer 3-1 are connected to the transformers 1, 2, and 3 respectively. In the present description, one to generate electric power and to sell surplus electric power and one to purchase demanded electric power are not particularly distinguished from each other but are simply called customers. The electric power agreement system 201 is owned and managed by a retail operator. Each customer has a retail contract with the retail operator. The electric power line in FIG. 2 is shown as an example. A line facility connected to the electric power line can be at least one, and a customer connected to one line facility can be at least one.

Each customer transmits bidding information to the electric power agreement system 201 through a home energy management system (HEMS) owned by this customer, and the electric power agreement system 201 performs agreement processing on the basis of the received bidding information. A PC or a smart meter may be responsible for transmission of the bidding information from each customer to the electric power agreement system 201 instead of the HEMS, as long as it includes a communication unit, a storage unit, and a processor.

A transaction target of the agreement processing is the amount of electric power in positive 30 minutes. The positive 30 minutes mean a period from X o'clock to X thirty or from X thirty to (X+1) o'clock. Here, X is an optional natural number. A market is to be opened by the start time of positive 30 minutes as a transaction target, and the electric power agreement system 201 performs the agreement processing at the start time. Regarding a transaction of the amount of electric power from 2019/1/1 00:00 to 2019/1/1 00:30, for example, bedding is permitted until 2019/1/1 00:00 and the agreement processing is performed on 2019/1/1 00:00. The blind single price auction system is used for the agreement.

<A-2. Operation>

Figure 3:
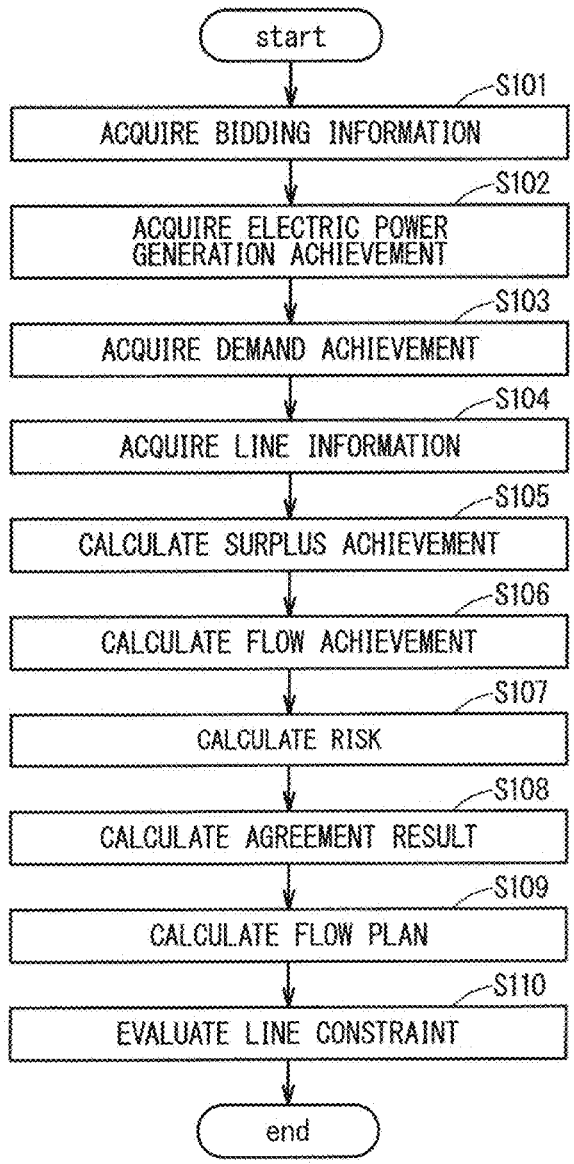
FIG. 3 is a flowchart showing the operation of the electric power agreement system according to the first embodiment.

FIG. 3 is a flowchart showing the operation of the electric power agreement system 201. The operation of the electric power agreement system 201 will be described on the basis of the flowchart in FIG. 3 while the amount of electric power from 2019/1/1 00:00 to 2019/1/1 00:30 is an example of a transaction target. The electric power agreement system 201 calculates the agreement result 1006 on 2019/1/1 00:00, and determines the presence or absence of deviation from line constraint by giving consideration to the risk that the amount of electric power actually flowing through a line will deviate from the agreement result 1006.

First, the bidding information acquisition unit 101 acquires the bidding information 1001 about each customer (step S101). FIGS. 4 to 6 show examples of the bidding information 1001. As shown in FIGS. 4 to 6, the bidding information 1001 includes a header part and a body part. The header part of the bidding information 1001 includes identification information about a customer such as a customer number and an indication of sale or purchase. The indication of sale or purchase indicates whether bidding is for sale or for purchase. FIG. 4 shows the bidding information 1001 about sale about the customer 1-1. FIG. 5 shows the bidding information 1001 about purchase about the customer 2-1. FIG. 6 shows the bidding information 1001 about purchase about the customer 3-1. The body part of the bidding information 1001 has a first row indicating a unit price (¥/kWh) and a second row indicating the amount of electric power (kWh).

Figure 7:
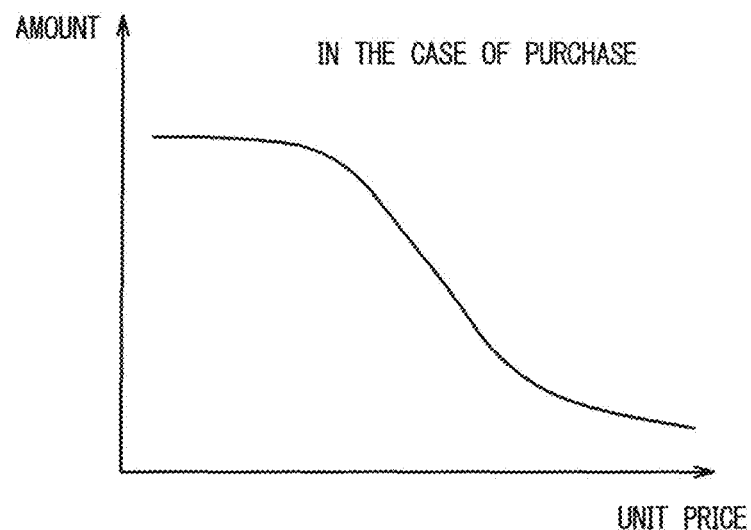
FIG. 7 shows a relationship between a unit price and an amount in bidding information about purchase.
Figure 8:
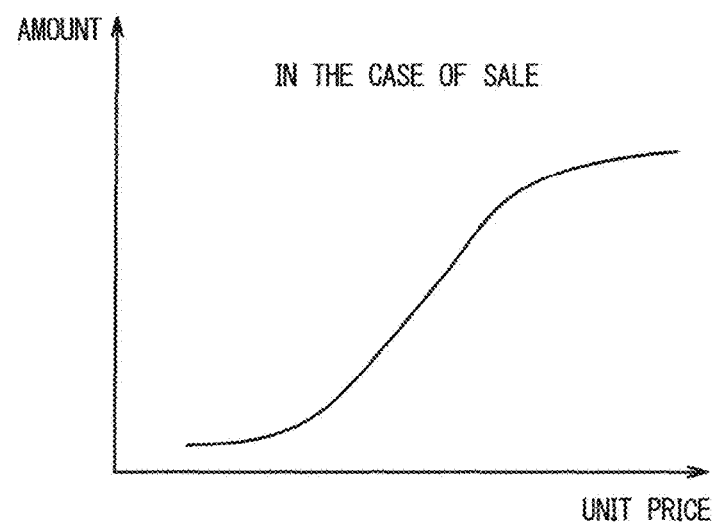
FIG. 8 shows a relationship between a unit price and an amount in bidding information about sale.

FIG. 7 shows the body part of the bidding information 1001 about purchase in the form of a graph with a horizontal axis indicating a unit price and a vertical axis indicating an amount. FIG. 8 shows the body part of the bidding information 1001 about sale in the form of a graph prepared in the same way. As the single price auction system is used for agreement, the body part of the bidding information 1001 is generally drawn in a downward sloping graph in the case of purchase and is drawn in an upward sloping graph in the case of sale.

Figures 9, 10, 11:
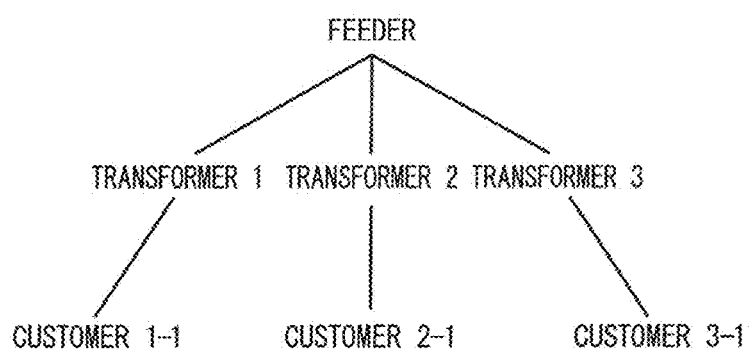
FIG. 9 shows electric power generation achievement information according to the first embodiment.
FIG. 10 shows demand achievement information according to the first embodiment.
FIG. 11 shows a line topology according to the first embodiment.

Next, the electric power generation achievement acquisition unit 102 acquires the electric power generation achievement information 1002 indicating an electric power generation achievement of each customer (step S102). The electric power generation achievement means an actual number of the amount of electric power actually generated by a customer. FIG. 9 shows an example of the electric power generation achievement information 1002 about the customer 2-1. As shown in FIG. 9, the electric power generation achievement information 1002 includes a header part and a body part. The header part of the electric power generation achievement information 1002 includes a customer number. The body part of the electric power generation achievement information 1002 has a first row indicting a time zone of positive 30 minutes and a second row indicating the amount of electric power (kWh) corresponding to the electric power generation achievement.

Next, the demand achievement acquisition unit 103 acquires demand achievement information 1003 indicating a demand achievement of each customer (step S103). The demand achievement means an actual number of the amount of electric power actually consumed by a customer. FIG. 10 shows an example of the demand achievement information 1003 about the customer 2-1. As shown in FIG. 10, the demand achievement information 1003 includes a header part and a body part. The header part includes a customer number. The body part has a first row indicating a time zone of positive 30 minutes and a second row indicating the amount of electric power (kWh) corresponding to the demand achievement.

Next, the line information acquisition unit 104 acquires the line information 1004 (step S104). The line information 1004 is information about an electric power line to which the electric power agreement system 201 is applied, and includes a line topology indicating the configuration of the electric power line and information about constraint on a line facility of the electric power line (this will be called "facility constraint information"). FIG. 11 shows an example of the line topology. The line topology in FIG. 11 means that the transformers 1, 2, and 3 are connected to a feeder, the customer 1-1 is connected to the transformer 1, the customer 2-1 is connected to the transformer 2, and the customer 3-1 is connected to the transformer 3. FIG. 12 shows an example of the facility constraint information. The facility constraint information has a first row indicating identification information about a line facility such as a line facility number and a second row indicating capacity constraint. The capacity constraint indicates an upper permissible value of the amount of electric power (including a reverse flow) to flow through the line facility. Specifically, in the example shown in FIG. 12, the amount of electric power to flow through the transformer 1 is constrained to be equal to or less than 22 (kWh), the amount of electric power to flow through the transformer 2 is constrained to be equal to or less than 20 (kWh), and the amount of electric power to flow through the transformer 3 is constrained to be equal to or less than 21 (kWh).

Next, the surplus achievement calculation unit 105 calculates a surplus achievement (step S105). The surplus achievement means an actual number of the amount of electric power that becomes a surplus for a customer and is calculated by subtracting a demand achievement from an electric power generation achievement for each time zone. FIG. 13 shows an example of the surplus achievement information indicating the surplus achievement. As shown in FIG. 13, the surplus achievement information includes a header part and a body part. The header part of the surplus achievement information includes a customer number. The body part of the surplus achievement information has a first row indicating a time zone of positive 30 minutes and a second row indicating the amount of electric power (kWh) corresponding to the surplus achievement. Regarding the surplus achievement of the customer 2-1 in a time zone from 2018/12/31 23:30 to 2019/1/1 00:00, for example, as an electric power generation achievement in the same time zone is 10 (kWh) as shown in FIG. 9 and a demand achievement in the same time zone is 7 (kWh) as shown in FIG. 10, it is calculated as 10−7=3 (kWh). As the surplus achievement is determined by subtracting a demand achievement from an electric power generation achievement, a positive value of the surplus achievement means a reverse flow and a negative value thereof means a forward flow.

Next, the flow achievement calculation unit 106 calculates a flow achievement of each line facility on the basis of the line information 1004 and a surplus achievement in the past (step S106). The flow achievement means an actual number of the amount of electric power having flowed through each line facility. FIG. 14 shows an example of the flow achievement information indicating the flow achievement. As shown in FIG. 14, the flow achievement information includes a header part and a body part. The header part of the flow achievement information indicates identification information about a line facility such as a line facility number. The body part of the flow achievement information has a first row indicating a time zone of positive 30 minutes and a second row indicating the amount of electric power (kWh) of the flow achievement. The flow achievement calculation unit 106 determines a total value of surplus achievements of a customer connected to each line facility to be the flow achievement. For example, the flow achievement calculation unit 106 sees that the customer 2-1 is connected to the transformer 2 on the basis of the line information, and acquires a surplus achievement of the customer 2-1 from the surplus achievement calculation unit 105. Then, the flow achievement calculation unit 106 determines this surplus achievement of the customer 2-1 to be the flow achievement of the transformer 2.

Next, on the basis of a flow achievement in the past, a flow plan in the past, and an evaluation index 1005, the risk calculation unit 108 calculates a variation of a flow achievement from a flow plan assumed in the future as a risk (step S107). The flow plan means the amount of electric power to flow through each line facility if surplus electric power of each consumer conforms to the agreement result 1006 and is calculated in step S109 described later. FIG. 15 shows an example of flow plan information indicating the flow plan in the past. As shown in FIG. 15, the flow plan information includes a header part and a body part. The header part of the flow plan information indicates identification information about a line facility such as a line facility number. The body part of the flow plan information has a first row indicating a time zone of positive 30 minutes and a second row indicating the amount of electric power (kWh) corresponding to the flow plan.

The evaluation index 1005 is an index indicating to which extent a variation of a flow achievement from a flow plan in the past is to be calculated as a risk. FIG. 16 shows an example of the evaluation index 1005. In the example shown in FIG. 16, the evaluation index 1005 shows "worst case in the past." Thus, the risk calculation unit 108 calculates a variation occurring in the worst case in the past, specifically, calculates a maximum of a variation of the flow achievement from the flow plan in the past as a risk.

FIGS. 17 to 19 show examples of risk information indicating a risk. As shown in FIGS. 17 to 19, the risk information includes a header part and a body part. The header part of the risk information indicates identification information about a line facility such as a line facility number. The body part of the risk information has a first row indicating a time zone of positive 30 minutes of any date, a second row indicating an upward risk, and a third row indicating a downward risk. Here, the upward risk shows a maximum of a value (determined by subtracting a flow plan from a flow achievement) in the past in the time zone of the first row. Specifically, the upward risk shows a variation determined when the flow achievement varied most in the past toward a value exceeding the flow plan. However, if the flow achievement did not exceed the flow plan in the past, the upward risk is determined to be 0. The downward risk shows a maximum of a value (determined by subtracting a flow plan from a flow achievement) in the past in the time zone of the first row. Specifically, the downward risk shows a variation determined when the flow achievement varied most in the past toward a value falling under the flow plan. However, if the flow achievement did not fall under the flow plan in the past, the downward risk is determined to be 0.

A risk of the transformer 2 in a time zone from 00:00 to 00:30 will be described using the flow achievement information shown in FIG. 14 and the flow plan information shown in FIG. 15 as examples. With focus on the time zone from 00:00 to 00:30, as seen from FIG. 14, flow achievements on 2018/12/29, 2018/12/30, and 2018/12/31 are 6 (kWh), 5 (kWh), and −2 (kWh) respectively. As seen from FIG. 15, flow plans for 2018/12/29, 2018/12/30, and 2018/12/31 in the same time zone are 1 (kWh), 2 (kWh), and 3 (kWh) respectively. Accordingly, regarding the time zone from 00:00 to 00:30, an upward risk of the transformer 2 is determined to be 5 (kWh)=max {6-1, 5-2, −2-3}, and a downward risk thereof is determined to be −5 (kWh)=min {6-1, 5-2, −2-3}.

The risk occurring in the situation where the evaluation index 1005 is "worst case in the past" is as has been described above. The evaluation index 1005 may alternatively be "possibility of equal to or greater than 90%," for example. In this case, the risk calculation unit 108 calculates a variation as a risk that is to be determined if a flow achievement is assumed to vary from a flow plan with a probability of equal to or greater than 90% based on data in the past. More specifically, in a 90% confidential interval of a probability distribution indicating a variation of a flow achievement from a flow plan in the past, the risk calculation unit 108 determines a maximum and a minimum in this interval to be an upward risk and a downward risk respectively. Here, a confidential interval to be considered is not limited to the 90% confidential interval but can be a confidential interval of any percentage.

Next, the agreement result calculation unit 109 calculates the agreement result 1006 from the bidding information 1001 using the blind single price auction system (step S108). FIGS. 20 to 22 show examples of agreement information indicating the agreement result 1006. As shown in FIGS. 20 to 22, the agreement information includes a header part and a body part. The header part of the agreement information indicates a customer number. FIG. 20 shows agreement information about the customer 1-1. FIG. 21 shows agreement information about the customer 2-1. FIG. 22 shows agreement information about the customer 3-1. The body part of the agreement information has a first row indicting a time zone of positive 30 minutes, a second row indicating an agreed amount of electric power (kWh), and a third row indicating an agreed price (¥/kWh).

Next, the flow plan calculation unit 107 calculates a flow plan on the basis of the agreement result 1006 calculated in step S108 (step S109). The flow plan means a value of the amount of electric power intended to flow through each line facility and is a total value of agreed amounts of electric power for a customer connected to each line facility. FIGS. 23 to 25 show examples of flow plan information indicating the flow plan. As shown in FIGS. 23 to 25, the flow plan information includes a header part and a body part. The header part of the flow plan information indicates a line facility number. The body part of the flow plan information has a first row indicting a time zone of positive 30 minutes and a second row indicating the amount of electric power (kWh) corresponding to the flow plan. FIG. 23 shows flow plan information about the transformer 1. FIG. 24 shows flow plan information about the transformer 2. FIG. 25 shows flow plan information about the transformer 3. The flow plan information in FIG. 24 is prepared by adding a flow plan in a time zone from 2019/1/1 00:00 to 2019/1/1 00:30 next to the leftmost column of the body part of the flow plan information in FIG. 15. The flow plan calculation unit 107 determines a total of agreed amounts of electric power for a customer connected to each line facility to be the flow plan. For example, the flow plan calculation unit 107 sees that the customer 2-1 is connected to the transformer 2 on the basis of the line information, and acquires the agreement result 1006 about the customer 2-1 from the agreement result calculation unit 109. Then, the flow plan calculation unit 107 determines an agreed amount of electric power for the customer 2-1 to be a flow plan for the transformer 2.

Next, the line constraint evaluation unit 110 determines whether the flow plan made for the plan facility individually by giving consideration to the risk fulfills line constraint, specifically, makes a line constraint evaluation (step S110). More specifically, the line constraint evaluation unit 110 adds the risk to the flow plan calculated in step S109, determines whether the flow plan to which the risk has been added (this will also be called a "risk-considered flow plan") fulfills the line constraint, and outputs a result of the evaluation.

By using the capacity constraint shown in FIG. 12 as an example of the line constraint and using the flow plans shown in FIGS. 23 to 25 as examples, in an evaluation time zone (from 2019/1/1 00:00 to 2019/1/1 00:30), a flow plan for the transformer 1 is 19 (kWh), a flow plan for the transformer 2 is −18 (kWh), and a flow plan for the transformer 3 is −1 (kWh). The capacity constraint on the transformer 1 is 22 (kWh), the capacity constraint on the transformer 2 is 20 (kWh), and the capacity constraint on the transformer 3 is 21 (kWh). Thus, the flow plan without addition of the risk, namely, the flow plan without giving consideration to the risk fulfills the capacity constraint.

As shown in FIG. 18, however, the upward risk is 5 (kWh) and the downward risk is −5 (kWh) for the transformer 2 in the evaluation time zone. Thus, a flow plan made by giving consideration to the upward risk is −18+5=−13 (kWh) and a flow plan made by giving consideration to the downward risk is −18−5=−23 (kWh). Here, the flow plan −23 (kWh) made by giving consideration to the downward risk does not fulfill the capacity constraint of being equal to or less than 20 (kWh). Regarding the transformer 1, its flow plan made by giving consideration to the risk is still within a range from 18 (kWh) to 21 (kWh) to fulfill the capacity constraint of being equal to or less than 22 (kWh). Regarding the transformer 3, its flow plan made by giving consideration to the risk is still within a range from −4 (kWh) to 3 (kWh) to fulfill the capacity constraint of being equal to or less than 21 (kWh).

<A-3. Effect>

The electric power agreement system 201 of the first embodiment includes: the agreement result calculation unit 109 that calculates the agreement result 1006 including the amount of electric power to be traded and an electric power unit price about each of the customers; the flow achievement calculation unit 106 that calculates a total of actual numbers of the amount of surplus electric power about the customer connected to the line facility as a flow achievement for the line facility individually; the flow plan calculation unit 107 that calculates a total value of the amounts of electric power to be traded in the agreement result 1006 about the customer connected to the line facility as a flow plan for the line facility individually; the risk calculation unit 108 that calculates a variation of the flow achievement from the flow plan assumed in the future as a risk for the line facility individually on the basis of a variation of the flow achievement from the flow plan in the past; and the line constraint evaluation unit 110 that determines for the line facility individually whether a risk-considered flow plan obtained by adding the risk to the flow plan fulfills line constraint defined on the line facility. Thus, the electric power agreement system 201 is capable of determining whether the flow plan deviates from the line constraint while giving consideration to the risk of variation of the flow achievement from the flow plan.

B. Second Embodiment

<B-1. Configuration>

Figure 26:
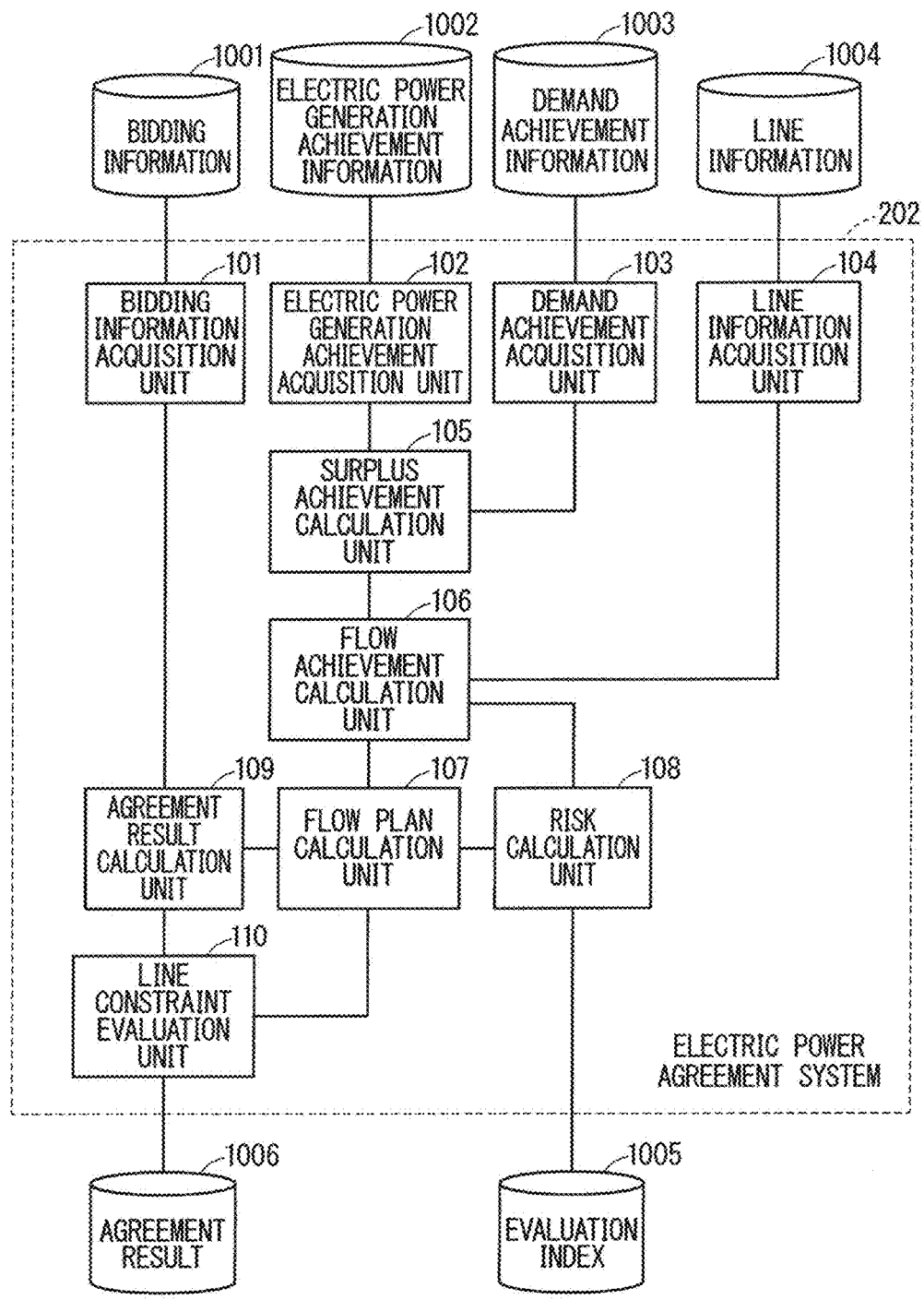
FIG. 26 is a configuration diagram of an electric power agreement system according to a second embodiment.

FIG. 26 is a configuration diagram of an electric power agreement system 202 according to a second embodiment. The electric power agreement system 202 is to make an agreement on trading of electric power with each customer of an electric power line and to determine whether a flow plan fulfills line constraint on the basis of the agreement result 1006. The electric power agreement system 202 includes the same constituting elements as the electric power agreement system 201 of the first embodiment. However, the electric power agreement system 202 differs from the electric power agreement system 201 in that the agreement result calculation unit 109 receives a result of evaluation by the line constraint evaluation unit, and if the flow plan does not fulfill the line constraint, splits a market in such a manner as to prevent deviation from the line constraint and recalculates the agreement result 1006.

Figure 27:
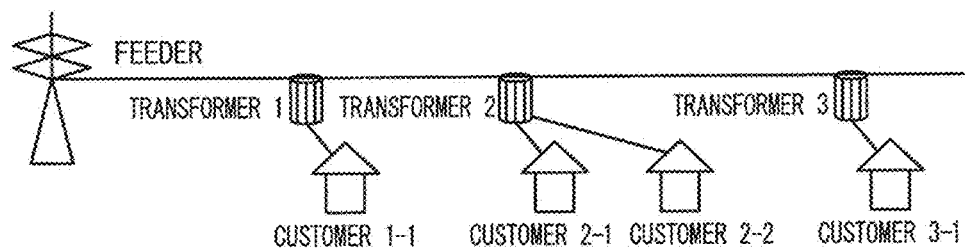
FIG. 27 shows an electric power line to which the electric power agreement system according to the second embodiment is applied.

FIG. 27 shows an electric power line to be evaluated in terms of line constraint by the electric power agreement system 202. As shown in FIG. 27, in the electric power line, the three transformers 1, 2, and 3 are connected to one feeder. The customer 1-1 is connected to the transformer 1, the customer 2-1 and a customer 2-2 are connected to the transformer 2, and the customer 3-1 is connected to the transformer 3.

The electric power agreement system 202 makes an agreement by the blind single price auction system. According to the single price auction system, unless the agreement result 1006 calculated for every piece of bidding information deviates from line constraint, the same agreed price is applied to all customers. If the agreement result 1006 deviates from the line constraint, the electric power agreement system 202 splits a market in such a manner as to prevent deviation from the line constraint and recalculates the agreement result 1006. In this case, a group of bidding for purchase and bidding for sale differs between markets, so that the amount of bidding and a price for purchase and the amount of bidding and a price for sale to be matched with each other differ between the markets. As an example, if the customer 1-1, the customer 2-1, the customer 2-2, and the customer 3-1 submit bids, calculating the agreement results 1006 about all pieces of bidding information causes deviation from the line constraint. However, if deviation from the line constraint becomes avoidable by splitting the market into one for the customer 1-1 and the customer 3-1 and one for the customer 2-1 and the customer 2-2 and then calculating the agreement results 1006, the electric power agreement system 202 calculates the agreement result 1006 for each of the split markets individually. In this case, a difference is generated between an agreed price for the customer 1-1 and the customer 3-1 and an agreed price for the customer 2-1 and the customer 2-2.

<B-2. Operation>

Figure 28:
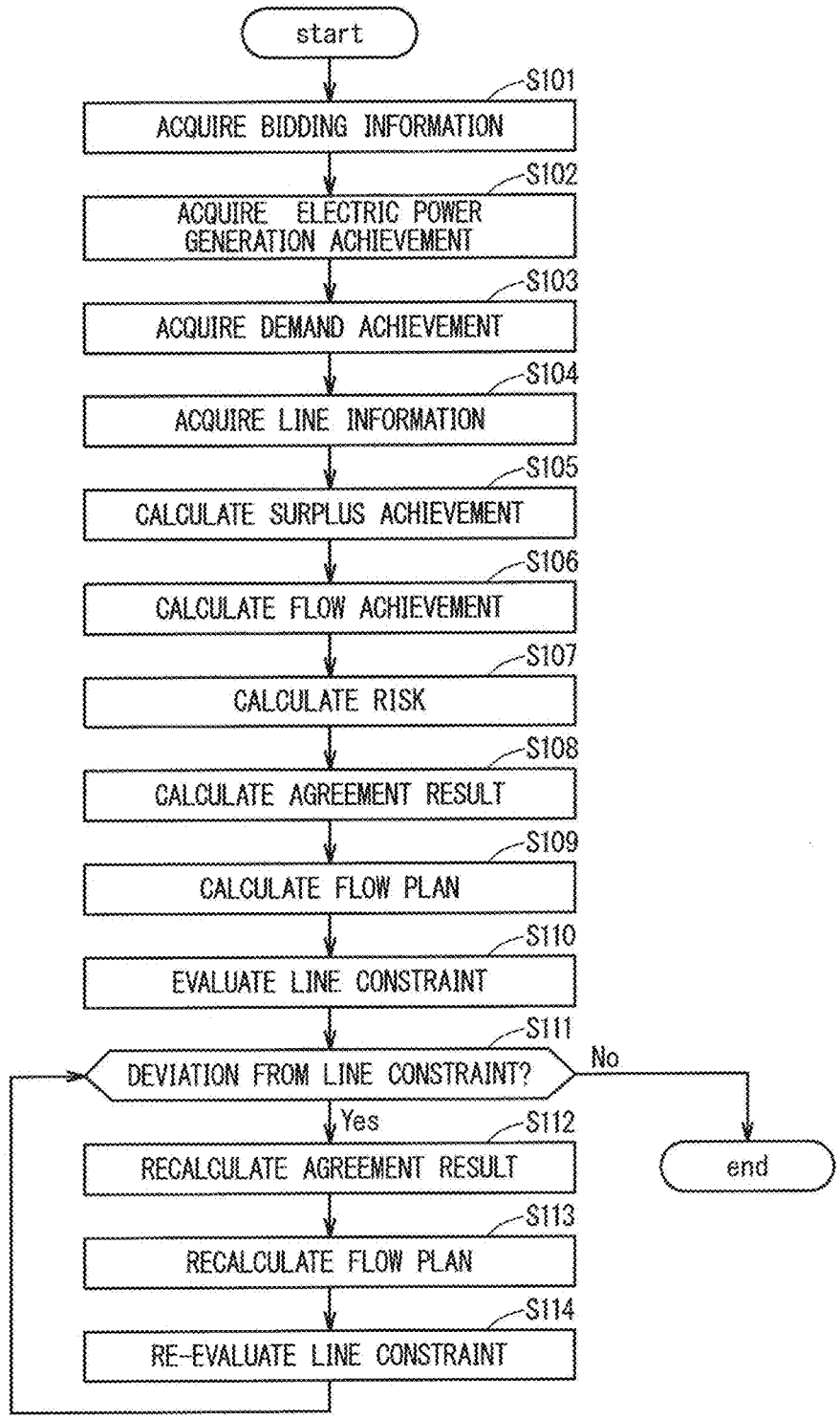
FIG. 28 is a flowchart showing the operation of the electric power agreement system according to the second embodiment.

FIG. 28 is a flowchart showing the operation of the electric power agreement system 202. The operation of the electric power agreement system 202 will be described on the basis of the flowchart in FIG. 28 while the amount of electric power from 2019/1/1 00:00 to 2019/1/1 00:30 is an example of a transaction target. The flow in FIG. 28 from step S101 to step S110 is the same as the flow in FIG. 3 described in the first embodiment. However, as the configuration of the electric power line is different from that of the first embodiment, explanation will be given again in line with the flow.

Figures 32, 33, 34, 35:
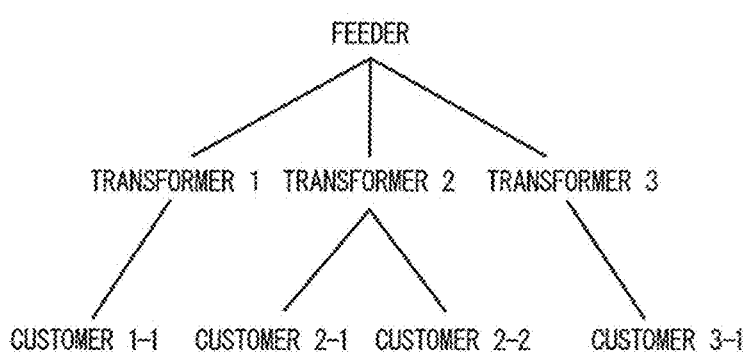
FIG. 32 shows bidding information according to the second embodiment.
FIG. 33 shows electric power generation achievement information according to the second embodiment.
FIG. 34 shows demand achievement information according to the second embodiment.
FIG. 35 shows a line topology according to the second embodiment.

First, the bidding information acquisition unit 101 acquires the bidding information 1001 about each customer (step S101). FIGS. 29 to 32 show examples of the bidding information 1001. The configuration of the bidding information 1001 is the same as that described in the first embodiment by referring to FIGS. 4 to 6. FIG. 29 shows the bidding information 1001 about sale about the customer 1-1. FIG. 30 shows the bidding information 1001 about sale about the customer 2-1. FIG. 31 shows the bidding information 1001 about sale about the customer 2-2. FIG. 32 shows the bidding information 1001 about purchase about the customer 3-1.

Next, the electric power generation achievement acquisition unit 102 acquires the electric power generation achievement information 1002 about each customer (step S102). FIG. 33 shows an example of the electric power generation achievement information 1002 about the customer 2-1. The configuration of the electric power generation achievement information 1002 is the same as that described in the first embodiment by referring to FIG. 9.

Next, the demand achievement acquisition unit 103 acquires the demand achievement information 1003 about each customer (step S103). FIG. 34 shows an example of the demand achievement information 1003 about the customer 2-1. The configuration of the demand achievement information 1003 is the same as that described in the first embodiment by referring to FIG. 10.

Next, the line information acquisition unit 104 acquires the line information 1004 (step S104). FIG. 35 shows an example of a line topology included in the line information 1004. The line topology in FIG. 35 means that the transformers 1, 2, and 3 are connected to a feeder, the customer 1-1 is connected to the transformer 1, the customer 2-1 and the customer 2-2 are connected to the transformer 2, and the customer 3-1 is connected to the transformer 3. FIG. 36 shows an example of facility constraint information included in the line information 1004. The configuration of the facility constraint information is the same as that described in the first embodiment by referring to FIG. 12.

Next, the surplus achievement calculation unit 105 calculates a surplus achievement (step S105). FIGS. 37 and 38 show examples of the surplus achievement information indicating the surplus achievement. The configuration of the surplus achievement information is the same as that described in the first embodiment by referring to FIG. 13. FIG. 37 shows the surplus achievement information about the customer 2-1. FIG. 38 shows the surplus achievement information about the customer 2-2.

Next, the flow achievement calculation unit 106 calculates a flow achievement of each line facility (step S106). FIG. 39 shows an example of the flow achievement information indicating the flow achievement. The configuration of the flow achievement information is the same as that described in the first embodiment by referring to FIG. 14. For example, the flow achievement calculation unit 106 sees that the customer 2-1 and the customer 2-2 are connected to the transformer 2 on the basis of the line information. Then, the flow achievement calculation unit 106 acquires a surplus achievement of the customer 2-1 and a surplus achievement of the customer 2-2 from the surplus achievement calculation unit 105. Next, the flow achievement calculation unit 106 determines a total of the surplus achievements of the customer 2-1 and the customer 2-2 to be the flow achievement of the transformer 2. As an example, the flow achievement of the transformer 2 in a time zone from 2018/12/31 23:30 to 2019/1/1 00:00 is 6 (kWh), which is a total of the surplus achievement 3 (kWh) of the customer 2-1 and the surplus achievement 3 (kWh) of the customer 2-2.

Next, on the basis of a flow achievement in the past, a flow plan in the past, and the evaluation index 1005, the risk calculation unit 108 calculates a risk of a flow plan in the future (step S107). FIG. 40 shows an example of flow plan information indicating the flow plan in the past. The configuration of the flow plan information is the same as that described in the first embodiment by referring to FIG. 15. FIG. 41 shows an example of the evaluation index 1005. In the example of FIG. 41, the evaluation index 1005 shows "worst case in the past."

FIGS. 42 to 44 show examples of risk information indicating a risk. The configuration of the risk information is the same as that described in the first embodiment by referring to FIGS. 17 to 19. A risk of the transformer 2 in a time zone from 00:00 to 00:30 will be described using the flow achievement information shown in FIG. 39 and the flow plan information shown in FIG. 40 as examples. With focus on the time zone from 00:00 to 00:30, as seen from FIG. 39, flow achievements on 2018/12/29, 2018/12/30, and 2018/12/31 are 5 (kWh), 5 (kWh), and 8 (kWh) respectively. As seen from FIG. 40, flow plans for 2018/12/29, 2018/12/30, and 2018/12/31 in the same time zone are 1 (kWh), 2 (kWh), and 3 (kWh) respectively. Accordingly, regarding the time zone from 00:00 to 00:30, an upward risk of the transformer 2 is determined to be 5 (kWh)=max {5-1, 5-2, 8-3, 0}, and a downward risk thereof is determined to be 0 (kWh)=min {5-1, 5-2, 8-3, 0}.

Next, the agreement result calculation unit 109 calculates the agreement result 1006 from the bidding information 1001 (step S108). FIGS. 45 to 48 show examples of agreement information indicating the agreement result 1006. The configuration of the agreement information is the same as that described in the first embodiment by referring to FIGS. 20 to 22. FIG. 45 shows agreement information about the customer 1-1. FIG. 46 shows agreement information about the customer 2-1. FIG. 47 shows agreement information about the customer 2-2. FIG. 48 shows agreement information about the customer 3-1. As the agreement is made using the blind single price auction method, the same agreed price is applied for any customer in this step.

Next, the flow plan calculation unit 107 calculates a flow plan on the basis of the agreement result 1006 calculated in step S108 (step S109). FIGS. 49 to 51 show examples of flow plan information indicating the flow plan. The configuration of the flow plan information is the same as that described in the first embodiment by referring to FIGS. 23 to 25. FIG. 49 shows flow plan information about the transformer 1. FIG. 50 shows flow plan information about the transformer 2. FIG. 51 shows flow plan information about the transformer 3. The flow plan information in FIG. 50 is prepared by adding a flow plan in a time zone from 2019/1/1 00:00 to 2019/1/1 00:30 next to the leftmost column of the body part of the flow plan information in FIG. 40. The flow plan calculation unit 107 determines a total of agreed amounts of electric power for a customer connected to each line facility to be the flow plan. For example, the flow plan calculation unit 107 sees that the customer 2-1 and the customer 2-2 are connected to the transformer 2 on the basis of the line information, and acquires the agreement result 1006 about each of the customer 2-1 and the customer 2-2 from the agreement result calculation unit 109. Then, the flow plan calculation unit 107 determines a total of agreed amounts of electric power for the customer 2-1 and the customer 2-2 to be a flow plan for the transformer 2.

Next, the line constraint evaluation unit 110 determines whether the flow plan made for the plan facility individually by giving consideration to the risk fulfills line constraint, specifically, makes a line constraint evaluation (step S110).

By using the capacity constraint shown in FIG. 36 as an example of the line constraint and using the flow plans shown in FIGS. 49 to 51 as examples, in an evaluation time zone (from 2019/1/1 00:00 to 2019/1/1 00:30), a flow plan for the transformer 1 is 19 (kWh), a flow plan for the transformer 2 is -18 (kWh), and a flow plan for the transformer 3 is -1 (kWh). The capacity constraint on the transformer 1 is 22 (kWh), the capacity constraint on the transformer 2 is 20 (kWh), and the capacity constraint on the transformer 3 is 21 (kWh). Thus, the flow plan without addition of the risk, namely, the flow plan without giving consideration to the risk fulfills the capacity constraint.

As shown in FIG. 43, however, an upward risk is 5 (kWh) and a downward risk is -5 (kWh) for the transformer 2 in the evaluation time zone. Thus, a flow plan made by giving consideration to the upward risk is -18+5=-13 (kWh) and a flow plan made by giving consideration to the downward risk is -18-2=-23 (kWh). Specifically, the flow plan for the transformer 2 determined by giving consideration to the risks is in a range from -13 (kWh) to -23 (kWh) and does not fulfill the capacity constraint of being equal to or less than 20 (kWh). Regarding the transformer 1, its flow plan made by giving consideration to the risk is still within a range from 18 (kWh) to 21 (kWh) to fulfill the capacity constraint of being equal to or less than 22 (kWh). Regarding the transformer 3, its flow plan made by giving consideration to the risk is still within a range from -4 (kWh) to 3 (kWh) to fulfill the capacity constraint of being equal to or less than 21 (kWh). Thus, the line constraint evaluation unit 110 determines that the flow plan made by giving consideration to the risk does not fulfill the line constraint in the transformer 2.

If the line constraint is fulfilled in every line facility (if Yes in step S111), the electric power agreement system 202 finishes the processing. On the other hand, if the line constraint is not fulfilled in at least one line facility like in the above-described example (if No in step S111), the agreement result calculation unit 109 recalculates the agreement result 1006 (step S112). In the above-described example, as the line constraint is not fulfilled in the transformer 2, the agreement result calculation unit 109 splits a market for the transformer 2. Specifically, the agreement result calculation unit 109 calculates the agreement results 1006 separately for the customers connected to the transformer 2 and for the other customers.

FIGS. 52 to 56 show examples of agreement information indicating the agreement result 1006 after the recalculation. FIG. 52 shows agreement information about the customer 1-1. FIG. 53 shows agreement information about the customer 2-1. FIG. 54 shows agreement information about the customer 2-2. FIG. 55 shows agreement information about the customer 3-1. According to the examples of the agreement information shown in FIGS. 52 to 55, an agreed price is changed from 11 (kWh) to 10 (kWh) for the customer 1-1 and the customer 3-1, and an agreed price is changed from 11 (kWh) to 12 (kWh) for the customer 2-1 and the customer 2-2. In this way, the market is split between the customers connected to the transformer 2 and the other customers to set the different agreed prices.

After step S112, the flow plan calculation unit 107 recalculates a flow plan on the basis of the agreement result 1006 calculated in step S111 (step S113). On the basis of the agreement information shown in each of FIGS. 52 to 55, flow plan information shown in each of FIGS. 56 to 58 is prepared. In comparison to the flow plan information previously prepared shown in each of FIGS. 49 to 51, flow plans for the transformers 1, 2, and 3 from 2019/1/1 00:00 to 2019/1/1 00:30 are changed from 19 (kWh), −18 (kWh), and −1 (kWh) to 8 (kWh), 0 (kWh), and −8 (kWh) respectively.

After step S113, the line constraint evaluation unit 110 makes a line constraint evaluation on the flow plan recalculated in step S113 (step S114). More specifically, the line constraint evaluation unit 110 adds the risk to the flow plan calculated in step S113 and determines whether the flow plan to which the risk has been added fulfills the line constraint. Process of the line constraint evaluation is the same as the process in step S110. In the examples of the flow plan information shown in FIGS. 56 to 58, as all the flow plans for the transformers 1, 2, and 3 prepared by giving consideration to the risks still fulfill the line constraint (Yes in step S111), the electric power agreement system 202 outputs the flow plans and the agreement result 1006 fulfilling the line constraint to the outside and finishes the processing.

<B-3. Effect>

In the electric power agreement system 202 of the second embodiment, the agreement result calculation unit 109 recalculates the agreement result 1006 about the customer connected to a deviating line facility by changing an electric power unit price until the line constraint evaluation unit 110 determines that the risk-considered flow plan for the deviating line facility fulfills the line constraint. The deviating line facility is the line facility for which the risk-considered flow plan is determined not to fulfill the line constraint by the line constraint evaluation unit 110. This allows the electric power agreement system 202 to calculate the agreement result 1006 about the customer in such a manner as to fulfill the line constraint while giving consideration to the risk of variation of the flow achievement from the flow plan.

Furthermore, in the electric power agreement system 202 of the second embodiment, the agreement result calculation unit 109 splits a market for the deviating line facility from a market for the other line facility, and recalculates the agreement result 1006 about the customer by changing the electric power unit price for each of the split markets. This allows the electric power agreement system 202 to calculate the agreement result 1006 about the customer in such a manner as to fulfill the line constraint while giving consideration to the risk of variation of the flow achievement from the flow plan.

C. Third Embodiment

<C-1. Configuration>

In the second embodiment, even after recalculation of the agreement result 1006, a line constraint evaluation is made on the basis of a constant risk. In an actual case, however, the risk might vary in response to the recalculation of the agreement result 1006. For example, if a market is split so corresponding reduction in sellers is caused, a customer to submit a bid for purchase for the same amount as an expected value of demand encounters reduction in agreeable bids compared to the absence of market split. This might cause serious alienation between a bid quantity and an agreed quantity. In response to this, in a third embodiment, a risk determined by giving consideration to an agreement condition such as market split is evaluated to increase the accuracy of risk evaluation.

Figure 59:
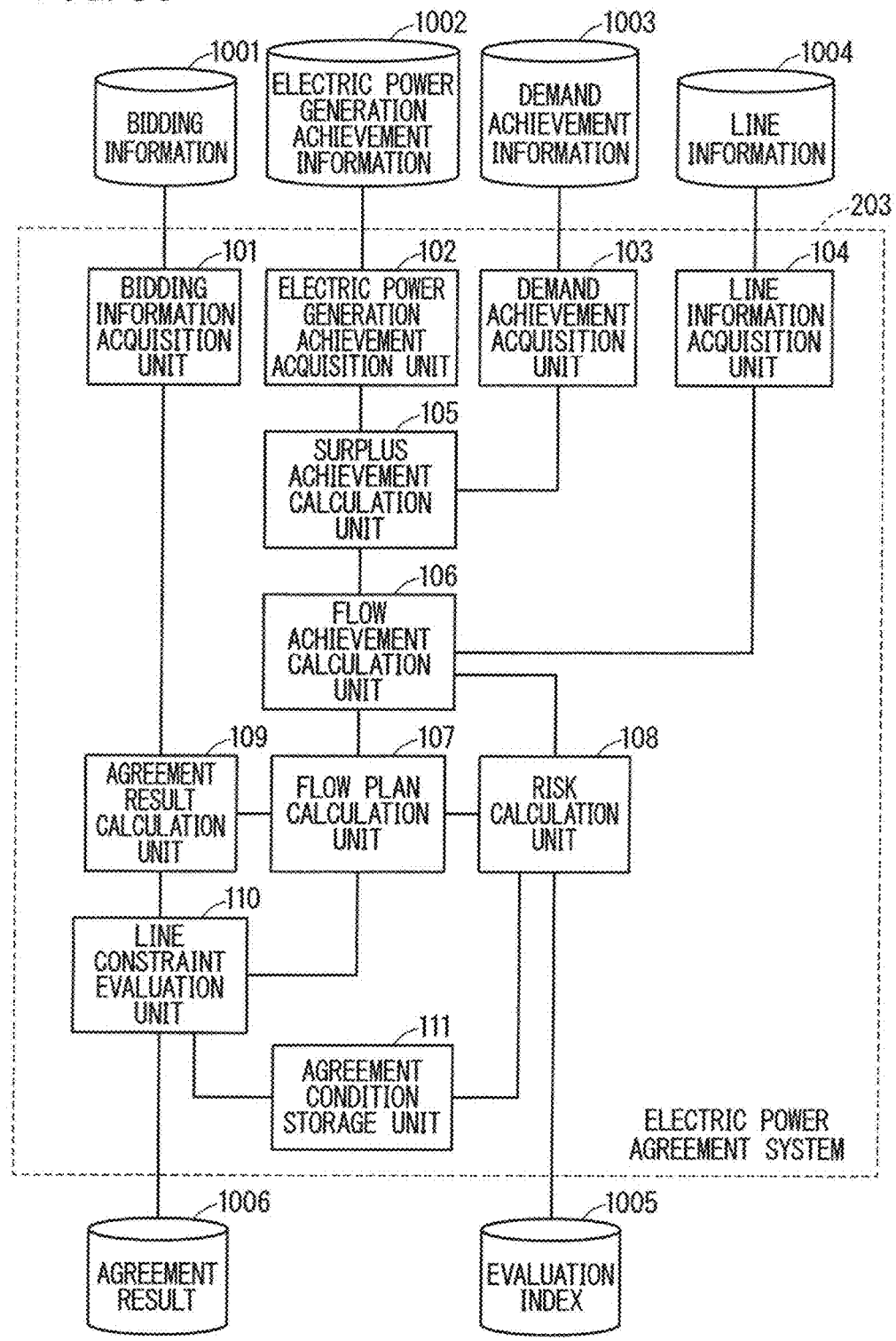
FIG. 59 is a configuration diagram of an electric power agreement system according to a third embodiment.

FIG. 59 is a configuration diagram of an electric power agreement system 203 according to the third embodiment. The electric power agreement system 203 includes an agreement condition storage unit 111 in addition to the structures of the electric power agreement system 202 according to the second embodiment. The agreement condition storage unit 111 stores an agreement condition such as market split. The risk calculation unit 108 calculates a risk by giving consideration to the agreement condition such as market split.

<C-2. Operation>

Figure 60:
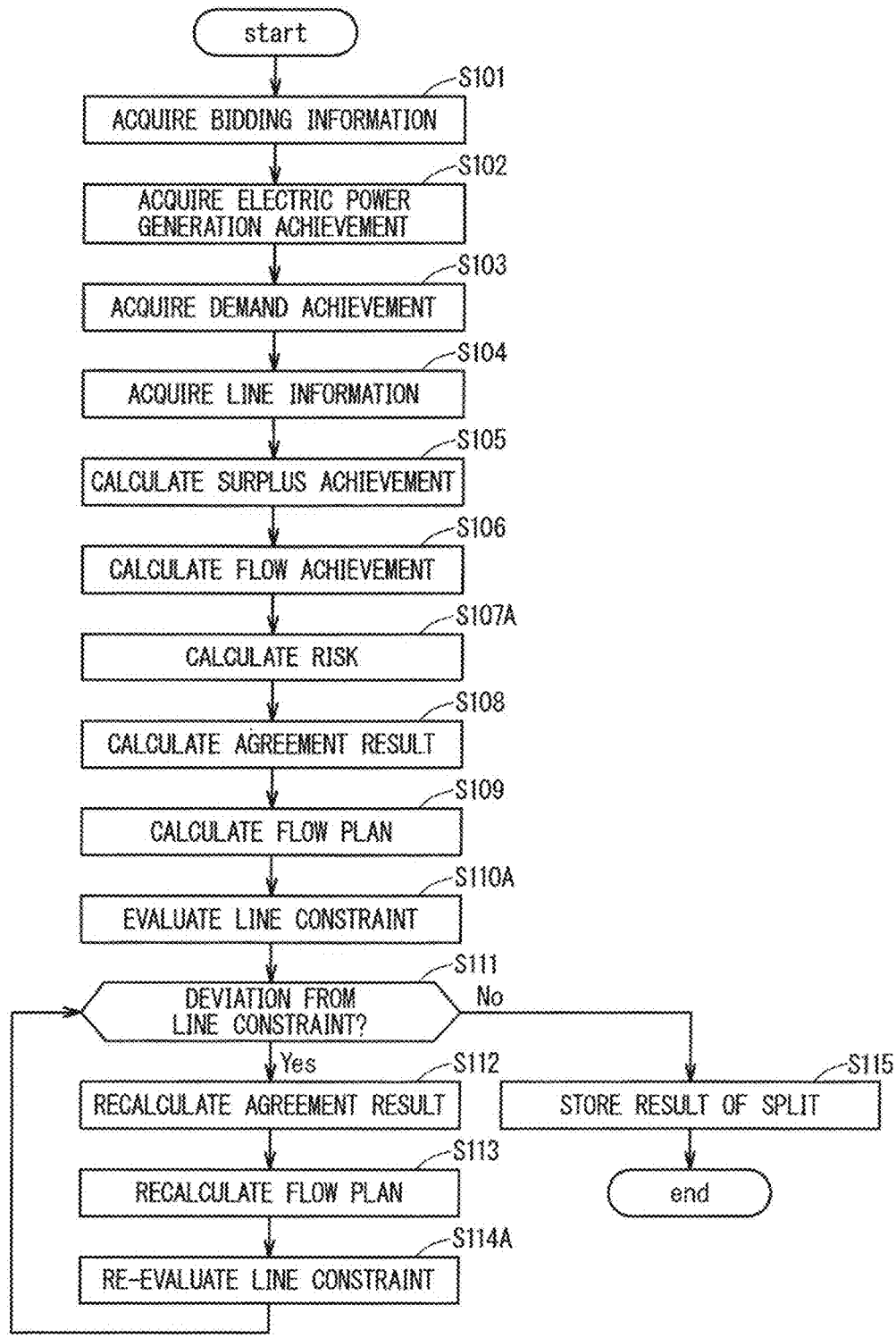
FIG. 60 is a flowchart showing the operation of the electric power agreement system according to the third embodiment.

FIG. 60 is a flowchart showing the operation of the electric power agreement system 203. The operation of the electric power agreement system 203 will be described on the basis of the flow in FIG. 60. Steps from step S101 to step S106 in FIG. 60 are the same as those of the second embodiment.

After step S106, the risk calculation unit 108 calculates a risk on the basis of a result about market split stored in the agreement condition storage unit 111 (step S107A). FIG. 61 shows split information indicating the split result. The split information has a first row indicating a time zone of positive 30 minutes and a second row indicating a split pattern. FIG. 62 shows split pattern information indicating the split pattern. The split pattern information has a first row indicating a line facility, and a second row and subsequent rows in which the presence or absence of market split is indicated by ○ or x for each pattern. The presence and absence are indicated by ○ and x respectively. As an example, a pattern 2 is applied from 2018/12/31 23:30 to 2019/1/1 00:00, so that the split did not occur in the transformer 1 and in the transformer 3 while the split occurred in the transformer 2.

The risk calculation unit 108 calculates a risk for each split pattern. A risk of the transformer 2 in a time zone from 00:00 to 00:30 will be described using the flow achievement information shown in FIG. 39 and the flow plan information shown in FIG. 40 as examples. With focus on the time zone from 00:00 to 00:30, as seen from FIG. 39, flow achievements on 2018/12/29, 2018/12/30, and 2018/12/31 are 5 (kWh), 5 (kWh), and 8 (kWh) respectively. As seen from FIG. 40, flow plans for 2018/12/29, 2018/12/30, and 2018/12/31 in the same time zone are 1 (kWh), 2 (kWh), and 3 (kWh) respectively.

Of the time zone from 00:00 to 00:30 on 2018/12/29, that on 2018/12/30, and that on 2018/12/31, only the time zones on the two days including 2018/12/31 and 2018/12/30 apply to a pattern 1. Thus, an upward risk of the transformer 2 in the time zone from 00:00 to 00:30 following the pattern 1 is determined to be 5 (kWh)=max {5-2, 8-3, 0}, and a downward risk thereof is determined to be 0 (kWh)=min {5-2, 8-3, 0}.

Of the time zone from 00:00 to 00:30 on 2018/12/29, that on 2018/12/30, and that on 2018/12/31, only the time zone on 2018/12/29 applies to the pattern 2. Thus, an upward risk of the transformer 2 in the time zone from 00:00 to 00:30 following the pattern 2 is determined to be 4 (kWh)=max {5-1, 0}, and a downward risk thereof is determined to be 0 (kWh)=min {5-1, 0}. In this way, the risk calculation unit 108 calculates a risk of each line facility according to each of the patterns, and stores the calculated risk into the agreement condition storage unit 111.

FIGS. 63 to 65 show risk information following each pattern stored in the agreement condition storage unit 111. FIGS. 63, 64, and 65 show risk information following the pattern 1 about the transformer 1, about the transformer 2, and about the transformer 3 respectively. As shown in FIGS. 63 to 65, a header part of the risk information includes identification information about a line facility such as a line facility number and additionally, pattern information.

Step S108 and step S109 after step S107A are the same as those of the second embodiment. After step S109, the line constraint evaluation unit 110 makes a line constraint evaluation for the line facility individually (step S110A). As an evaluation in this step mentioned herein is to be made for the first time, the line constraint evaluation unit 110 makes a line constraint evaluation using a risk following the pattern 1 without split. The line constraint evaluation is made by the same method as that of the second embodiment.

Steps from step S111 to step S113 after step S110A are the same as those of the second embodiment. After step S113, the line constraint evaluation unit 110 makes a line constraint evaluation on the flow plan recalculated in step S113 (step S114A). Here, the line constraint evaluation unit 110 makes the line constraint evaluation using a risk conforming to a current market split pattern. If split occurs only for the transformer 2, for example, the line constraint evaluation unit 110 adds a risk following the pattern 2 to the flow plan and then makes the line constraint evaluation.

In step S111, if the line constraint evaluation unit 110 determines that a flow plan to which the risk has been added does not deviate from the line constraint, the line constraint evaluation unit 110 stores a result about the current market split into the agreement condition storage unit (step S115).

<C-3. Effect>

In the electric power agreement system 203 of the third embodiment, the risk calculation unit 108 calculates a risk for the line facility individually and for the market split pattern individually, and the line constraint evaluation unit 110 obtains a risk-considered flow plan by adding a risk corresponding to a market split pattern at the time of calculation of a flow plan to the flow plan. In this way, in the electric power agreement system 203, a risk is calculated for the market split pattern individually to achieve increase in the accuracy of risk calculation.

D. Hardware Configuration

The bidding information acquisition unit 101, the electric power generation achievement acquisition unit 102, the demand achievement acquisition unit 103, the line information acquisition unit 104, the surplus achievement calculation unit 105, the flow achievement calculation unit 106, the flow plan calculation unit 107, the risk calculation unit 108, the agreement result calculation unit 109, the line constraint evaluation unit 110, and the agreement condition storage unit 111 of the above-described electric power agreement system 201, 202, or 203 are realized by a processing circuit 81 shown in FIG. 66. Namely, the processing circuit 81 includes the bidding information acquisition unit 101, the electric power generation achievement acquisition unit 102, the demand achievement acquisition unit 103, the line information acquisition unit 104, the surplus achievement calculation unit 105, the flow achievement calculation unit 106, the flow plan calculation unit 107, the risk calculation unit 108, the agreement result calculation unit 109, the line constraint evaluation unit 110, and the agreement condition storage unit 111 (these units will be called "units including the agreement result calculation unit 109"). The processing circuit 81 may be dedicated hardware, or may be a processor to execute a program stored in a memory. The processor may be a central processing unit, a processing device, an arithmetic device, a microprocessor, a microcomputer, or a digital signal processor (DSP), for example.

If the processing circuit 81 is dedicated hardware, the processing circuit 81 corresponds to a single circuit, a complex circuit, a programmed processor, a parallel-programmed processor, an application specific integrated circuit (ASIC), a field-programmable gate array (FPGA), or a combination thereof, for example. The function of each unit such as the . . . unit may be realized by a plurality of the processing circuits 81. Alternatively, the functions of all the units may be realized together in one processing circuit.

If the processing circuit 81 is a processor, the functions of the units including the agreement result calculation unit 109 are realized by combination with software, etc. (software, firmware, or software and firmware). Such software is described as a program and stored into a memory. As shown in FIG. 67, a processor 82 applied to the processing circuit 81 reads a program stored in a memory 83 and executes the read program, thereby realizing the function of each unit. Specifically, the electric power agreement system 201, 202, or 203 includes the memory 83 for storing a program to be executed by the processing circuit 81 to result in implementations of: the step of calculating the agreement result 1006 including the amount of electric power to be traded and an electric power unit price about each of the customers; the step of calculating a total of actual numbers of the amount of surplus electric power about the customer connected to the line facility as a flow achievement for the line facility individually; the step of calculating a total value of the amounts of electric power to be traded in the agreement result 1006 about the customer connected to the line facility as a flow plan for the line facility individually; the step of calculating a variation of the flow achievement from the flow plan assumed in the future as a risk for the line facility individually on the basis of a variation of the flow achievement from the flow plan in the past; and the step of determining for the line facility individually whether a risk-considered flow plan obtained by adding the risk to the flow plan fulfills line constraint defined on the line facility. In other words, this program can be said to be a program for causing a computer to execute procedures or methods of the units including the agreement result calculation unit 109. Here, the memory 83 can be a nonvolatile or volatile semiconductor memory such as a random access memory (RAM), a read only memory (ROM), a flash memory, an erasable programmable read only memory (EPROM) or an electrically erasable programmable read only memory (EEPROM), a hard disk drive (HDD), a magnetic disk, a flexible disk, an optical disk, a compact disk, a minidisk, a digital versatile disc (DVD), drivers thereof, or any type of storage medium assumed to be used in the future, for example.

In the foregoing configuration, the respective functions of the units including the agreement result calculation unit 109 are realized by one of hardware and software, etc. However, this is not the limited configuration. In one configuration, some of the units including the agreement result calculation unit 109 may be realized by dedicated hardware and a different one of the units may be realized by software, etc. For example, the function of the agreement result calculation unit 109 may be realized by a processing circuit as dedicated hardware, and the functions of the other units may be realized by causing the processing circuit 81 as the processor 82 to read the program stored in the memory 83 and to execute the read program.

As described above, the processing circuit is available for realizing each of the above-described functions using hardware, software, etc., or a combination thereof. While the agreement condition storage unit 111 is composed of the memory 83, it can be composed of the memory 83 as a single memory or may composed of memories each functioning as an individual memory.

The embodiments can be combined freely or each of the embodiments can be modified or omitted, if appropriate. The foregoing description is in all aspects illustrative. It is therefore understood that numerous modifications not shown can be devised.

EXPLANATION OF REFERENCE SIGNS

101 Bidding information acquisition unit
102 Electric power generation achievement acquisition unit
103 Demand achievement acquisition unit
104 Line information acquisition unit
105 Surplus achievement calculation unit
106 Flow achievement calculation unit
107 Flow plan calculation unit
108 Risk calculation unit
109 Agreement result calculation unit
110 Line constraint evaluation unit
111 Agreement condition storage unit
201 to 203 Electric power agreement system

The invention claimed is:

1. An electric power agreement system that evaluates a flow plan for an electric power line,
the electric power line including at least one line facility,
at least one customer connected to the at least one line facility,
the electric power agreement system comprising:
a processor to execute a program; and
a memory to store the program which, when executed by the processor, causes the processor to
calculate an agreement result including an amount of electric power to be traded and an electric power unit price for the at least one customer;
calculate a total of actual numbers of an amount of surplus electric power for the at least one customer connected to the at least one line facility as a flow achievement for the at least one line facility individually;
calculate a total value of the amounts of electric power to be traded in the agreement result corresponding to the at least one customer connected to the at least one line facility as the flow plan for the at least one line facility individually;
calculate a variation of the flow achievement from the flow plan assumed in the future as a risk for the at least one line facility individually on the basis of a variation of the flow achievement from the flow plan in the past;
determine for the at least one line facility individually whether a risk-considered flow plan obtained by adding the risk to the flow plan fulfills line constraint defined on the at least one line facility; and
execute the agreement result with the at least one customer according to the flow plan that fulfills the line constraint,
wherein the processor recalculates the agreement result corresponding to the at least one customer connected to a deviating line facility by changing the electric power unit price until the processor determines that the risk-considered flow plan for the deviating line facility fulfills the line constraint, the deviating line facility being a line facility for which the risk-considered flow plan is determined not to fulfill the line constraint.

2. The electric power agreement system according to claim 1, wherein a maximum of a variation of the flow achievement from the flow plan in the past is calculated as the risk.

3. The electric power agreement system according to claim 1, wherein a boundary value in a confidential interval of a probability distribution of a variation of the flow achievement from the flow plan in the past is calculated as the risk.

4. The electric power agreement system according to claim 1, wherein the processor splits a market for the deviating line facility from a market for others of the at least one line facility, and recalculates the agreement result for the at least one customer by changing the electric power unit price for each of the split markets.

5. The electric power agreement system according to claim 1, wherein
the processor calculates the risk for the at least one line facility individually and for a market split pattern individually, and
the processor obtains the risk-considered flow plan by adding the risk corresponding to the market split pattern at the time of calculation of the flow plan to the flow plan.

6. An electric power agreement method of evaluating a flow plan for an electric power line,
the electric power line including at least one line facility,
at least one customer connected to the at least one line facility,
the electric power agreement method comprising:
calculating an agreement result including an amount of electric power to be traded and an electric power unit price for the at least one customer;
calculating a total of actual numbers of an amount of surplus electric power for the at least one customer connected to the at least one line facility as a flow achievement for the at least one line facility individually;
calculating a total value of the amounts of electric power to be traded in the agreement result for the at least one customer connected to the at least one line facility as the flow plan for the at least one line facility individually;
calculating a variation of the flow achievement from the flow plan assumed in the future as a risk for the at least one line facility individually on the basis of a variation of the flow achievement from the flow plan in the past;
determining for the at least one line facility individually whether a risk-considered flow plan obtained by adding the risk to the flow plan fulfills line constraint defined on the at least one line facility; and
executing the agreement result with the at least one customer according to the flow plan that fulfills the line constraint,
wherein the agreement result corresponding to the at least one customer connected to a deviating line facility is recalculated by changing the electric power unit price until the processor determines that the risk-considered flow plan for the deviating line facility fulfills the line constraint, the deviating line facility being a line facility for which the risk-considered flow plan is determined not to fulfill the line constraint.

7. The electric power agreement method according to claim 6, wherein a maximum of a variation of the flow achievement from the flow plan in the past is calculated as the risk.

8. The electric power agreement method according to claim 6, wherein a boundary value in a confidential interval of a probability distribution of a variation of the flow achievement from the flow plan in the past is calculated as the risk.

9. The electric power agreement method according to claim 6, further comprising splitting a market for the deviating line facility from a market for others of the at least one line facility, and recalculating the agreement result for the at least one customer by changing the electric power unit price for each of the split markets.

10. The electric power agreement method according to claim 6, further comprising:
   calculating the risk for the at least one line facility individually and for a market split pattern individually, and
   obtaining the risk-considered flow plan by adding the risk corresponding to the market split pattern at the time of calculation of the flow plan to the flow plan.

11. A non-transitory computer-readable medium encoded with computer-readable instructions that, when executed by a processor, cause the processor to perform a method comprising:
   calculating an agreement result including an amount of electric power to be traded and an electric power unit price for at least one customer;
   calculating a total of actual numbers of an amount of surplus electric power for the at least one customer connected to at least one line facility as a flow achievement for the at least one line facility individually;
   calculating a total value of the amounts of electric power to be traded in the agreement result for the at least one customer connected to the at least one line facility as the flow plan for the at least one line facility individually;
   calculating a variation of the flow achievement from the flow plan assumed in the future as a risk for the at least one line facility individually on the basis of a variation of the flow achievement from the flow plan in the past;
   determining for the at least one line facility individually whether a risk-considered flow plan obtained by adding the risk to the flow plan fulfills line constraint defined on the at least one line facility; and
   executing the agreement result with the at least one customer according to the flow plan that fulfills the line constraint,
   wherein the agreement result corresponding to the at least one customer connected to a deviating line facility is recalculated by changing the electric power unit price until the processor determines that the risk-considered flow plan for the deviating line facility fulfills the line constraint, the deviating line facility being a line facility for which the risk-considered flow plan is determined not to fulfill the line constraint.

12. The non-transitory computer-readable medium according to claim 11, wherein a maximum of a variation of the flow achievement from the flow plan in the past is calculated as the risk.

13. The non-transitory computer-readable medium according to claim 11, wherein a boundary value in a confidential interval of a probability distribution of a variation of the flow achievement from the flow plan in the past is calculated as the risk.

14. The non-transitory computer-readable medium according to claim 11, further comprising splitting a market for the deviating line facility from a market for others of the at least one line facility, and recalculating the agreement result for the at least one customer by changing the electric power unit price for each of the split markets.

15. The non-transitory computer-readable medium according to claim 11, further comprising:
   calculating the risk for the at least one line facility individually and for a market split pattern individually, and
   obtaining the risk-considered flow plan by adding the risk corresponding to the market split pattern at the time of calculation of the flow plan to the flow plan.

* * * * *